(12) United States Patent
Yamaguchi et al.

(10) Patent No.: US 6,381,078 B1
(45) Date of Patent: Apr. 30, 2002

(54) OPTICAL DEVICE

(75) Inventors: Masao Yamaguchi, Funabashi; Takashi Shiraishi, Kawasaki, both of (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 26 days.

(21) Appl. No.: 09/667,554

(22) Filed: Sep. 22, 2000

(30) Foreign Application Priority Data

Sep. 24, 1999 (JP) .......................................... 11-270896

(51) Int. Cl.[7] .......................... G02B 9/00; G02B 27/14; G02B 26/08; B41J 2/455; B41J 15/14
(52) U.S. Cl. ...................... 359/738; 359/634; 359/739; 359/216; 347/233; 347/241; 347/243
(58) Field of Search ............................... 347/233, 241, 347/243, 244, 256, 257, 258, 259, 261; 359/203, 205, 207, 208, 216, 217, 634, 708, 710, 738, 739

(56) References Cited

U.S. PATENT DOCUMENTS

| | | | |
|---|---|---|---|
| 5,734,489 A | * | 3/1998 | Shiraishi et al. ............ 359/205 |
| 5,774,249 A | * | 6/1998 | Shiraishi et al. ............ 359/205 |
| 5,808,772 A | | 9/1998 | Yamaguchi et al. ........ 359/204 |
| 5,986,793 A | | 11/1999 | Yamaguchi et al. ........ 359/216 |
| 6,100,912 A | | 8/2000 | Shiraishi et al. ............ 347/233 |

FOREIGN PATENT DOCUMENTS

JP 2001-91873 A * 4/2001 ........... G02B/26/10

* cited by examiner

Primary Examiner—Georgia Epps
Assistant Examiner—David N. Spector
(74) Attorney, Agent, or Firm—Foley & Lardner

(57) ABSTRACT

An optical scanning device according to the present invention includes a lens to convert divergent rays from a laser diode to parallel or convergent rays, a slit to regulate luminous energy of the parallel or convergent rays, a before deflection optical system having lenses with different power for main-scanning and sub-scanning, optical scanning means to scan objects to be scanned with the parallel or convergent rays, and an imaging optical system for imaging on the objects to be scanned by passing the scanned rays with the optical scanning means, the slit of the before deflection optical system has an opening with a larger diameter than a 13.5% diameter of the optical intensity of the rays in at least one direction of the main-scanning and the sub-scanning directions. Thereby, it may be possible to reduce the sidelobe, and to control density irregularities of exposed images.

23 Claims, 16 Drawing Sheets

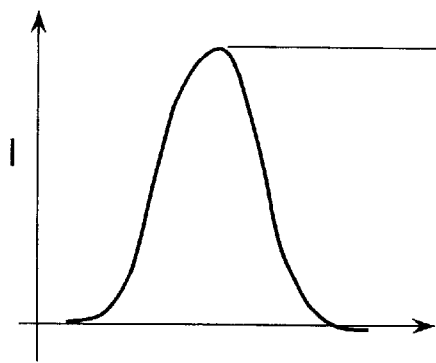 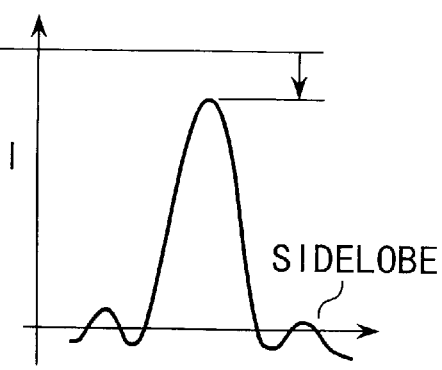
FIG. 13A   FIG. 13B
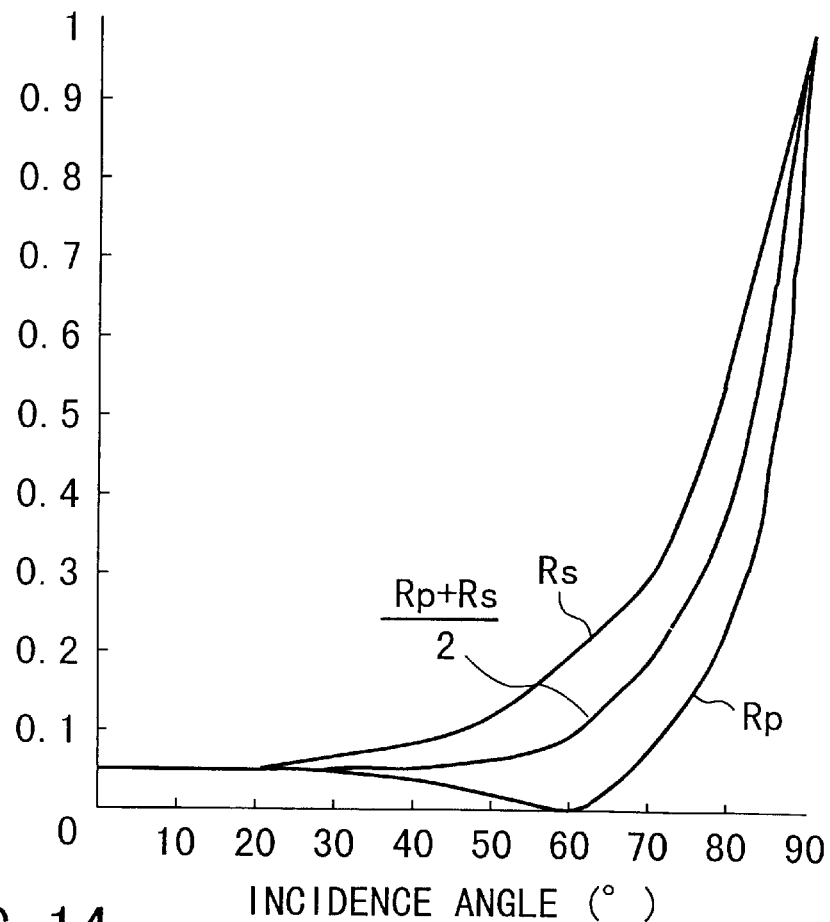
FIG. 14

OPTICAL DEVICE

CROSS-REFERENCE TO RELATED APPLICATIONS

This application is based upon and claims the benefit of priority from the prior Japanese Patent Application No. 11-270896, filed Sep. 24, 1999, the entire contents of which are incorporated herein by reference.

BACKGROUND OF THE INVENTION

The present invention relates to a multi-beam optical scanning device performing scanning with a plurality of beams for scanning, which may be used for a color printer, a color copying machine, a high-speed laser printer, or a digital copying machine, and the like; and an image forming device using the multi-beam optical scanning device.

The image forming device, such as the color printer, and the copying machine uses an optical scanning device (laser exposing device) providing image data corresponding to color components, that is, a plurality of laser beams to a plurality of image formation parts forming each image of color components obtained through color separation with subtractive primaries, that is, Yellow (Y) image, Magenta (M) image, Cyan (C) image, and, Black (B) image to enhance the ray and shade, and to the image formation parts.

There have been known two types of examples as the above image forming device, one is a plurality of optical scanning devices are arranged corresponding to each image formation part, and the other is a multi-beam optical scanning device is arranged so as to provide a plurality of laser beams.

The optical scanning device includes, a plurality of semiconductor laser devices (laser diodes) as light source, a first group of lenses (a before deflection optical system) which narrows section diameters of a plurality of laser beams emitted from each laser diode to a predetermined diameter, an optical deflection device which continuously reflects a plurality of laser beams narrowed by the first group of lenses in a direction perpendicular to a carrying direction of a recording medium, and a second group of lenses (an after deflection optical system) by which laser beams after deflection by the optical deflection device are imaged to a predetermined position of the recording medium. In many cases, the direction in which the laser beams are deflected by the optical deflection device is denoted as a main-scanning direction, and the carrying direction of the recording medium, that is, a direction perpendicular to the main-scanning direction as a sub-scanning direction.

A plurality of laser beams passing through the first group of lenses are continuously reflected (deflected) by a reflection plane of polygon mirror of the optical deflection device rotating at predetermined rotation speed for deflection in the main-scanning direction. Each deflected laser beam is imaged at a predetermined position of the recording medium by the second group of lenses.

The second group of lenses gives approximately the same section diameter of the laser beams on the recording medium to be scanned with polygon mirror of the optical deflection device to give different degrees of convergence depending on a point of reflection by the polygon mirrors.

Between the second group of lenses and an imaging position on the recording medium (photosensitive drum), there is a horizontal synchronization detector to detect that the laser beams reach a predetermined position before an area where an electrostatic latent image is recorded. When each laser beam enters the above detector, horizontal synchronization signals are generated.

Based on the above horizontal synchronization signal, the laser beams intensity-modulated according to the images, that is, image data to be recorded are irradiated to the photosensitive drum at a predetermined timing.

Generally, in the above optical scanning device, it is difficult to correct changes in image sizes (caused at any position in the main-scanning direction of the imaging position) according to the main-scanning position, and there is easily generated sidelobe. Generation of the sidelobe causes reduction in distribution of energy of the main beam in the intensity of the laser beams, and density especially in the lower density part is reduced by the changes in the distribution of energy, when latent images are formed on the photosensitive drum. Therefore, there is caused a problem that striped images are obtained. And, in the color image forming device, there is a problem that color balance is lost, even when there is caused only a density change in any one of colors due to overlapping four color images. Then, the generation of the sidelobe causes a serious problem for the color image forming device.

On the other hand, when plastic lenses are used for the after deflection optical system (the second group of lenses), it is well known that sidelobe is consequently caused, as the plastic lenses are usually made by injection molding to easily cause form errors. Therefore, when the plastic lenses are used for the color image forming device, there is a problem that there is easily caused a change in the density as previously described.

In molding using an insert die for making plastic lenses, a process to reduce surface roughness by polishing after molding is required. But, when plastic lenses without a symmetry axis of rotation are used, it is difficult to maintain a predetermined curved surface by polishing, and actually, to perform polishing. Therefore, there is larger sidelobe to cause easier change in the image density as previously described.

When, other than the above, a set of lenses are used for the after deflection optical system in the sub-scanning direction, it is required to have larger incidence angle in the sub-scanning direction, as there are laser beams passing through parts away from the center of the lenses in the sub-scanning direction. Therefore, optical aberration is increased to cause larger sidelobe.

And, laser beams irradiated from a semiconductor laser device have smaller angle of divergence in a parallel direction to the bonding surface of a laser oscillation chip and larger angle of divergence in a perpendicular direction larger than the smaller angle of divergence. Then, it is required that the beam section diameter in the main-scanning direction is smaller than the diameter of the sub-scanning direction, as a section diameter of the laser beams required of the optical scanning device. But, in order to secure luminous energy, considering the opposite luminescence characteristics, the beam section of the laser beam from the laser device is rotated to cause the smaller angle of divergence in the main-scanning direction. Accordingly, the beam section in the main-scanning direction becomes larger, that is, there is a problem to cause lower resolution.

On the other hand, vertical incidence causes the largest transmittance of lenses, and the transmittance becomes smaller in the case of a larger angle (incidence angle) with the normal line of a plane of incidence. Therefore, fθ lenses have larger incidence angle at the end part to reduce the transmittance. That is, there is a problem to cause larger difference in the image density, as there is larger difference in the luminous energy at the center part and the end part. There is an example to provide the surface of the lenses with evaporated film to reduce reflection in order to prevent decrease in the luminous energy at the end part. But, when the fθ lens is made of plastic, there are worse optical characteristics due to thermal deformation effected by evaporated film, in some cases. Then, it is difficult to obtain required performance, as a shape different from the final shape is required to be given at manufacturing lenses, considering the thermal deformation.

In the optical scanning device to form color images, when a set of lenses are used for the after deflection optical system in the sub-scanning direction, the problem of the transmittance as mentioned above may be also applied to the sub-scanning direction. Then, there is easily caused a problem that each color has each density.

As previously described, in plastic lenses with a lens surface having no symmetry axis of rotation, polishing after injection molding, and polishing of metal molds are difficult, and it is impossible to reduce the surface roughness. Therefore, color components scattered on the lens surface are generated to reduce the transmittance, and especially, the transmittance at the end part are reduced to cause a problem that there is an irregular density in the images.

BRIEF SUMMARY OF THE INVENTION

An object of the present invention is to provide an optical scanning device capable of reducing an irregular density in images, using the after deflection optical system comprising lenses made of plastic.

The present invention is to provide an optical device comprising: at least one of lens to convert divergent rays from a laser diode to parallel or convergent rays; a slit to regulate luminous energy of the parallel or convergent rays; a before deflection optical system having a lens or lenses with different power for main-scanning and sub-scanning; optical scanning means to scan objects to be scanned with the parallel or convergent rays; and an imaging optical system for imaging on the objects to be scanned by passing the scanned rays with the optical scanning means, wherein the slit of the before deflection optical system having an opening with a larger width than a 13.5% diameter of the optical intensity of the rays in at least one direction of the main-scanning and the sub-scanning directions.

The present invention is to provide an optical device comprising: at least one of lens or lenses to convert divergent rays from a laser diode to parallel or convergent rays; a before deflection optical system includes at least one of lens with different power for main-scanning and sub-scanning; optical scanning means to scan objects to be scanned with the parallel or convergent rays; and an imaging optical system for imaging on the objects to be scanned by passing the scanned rays with the optical scanning means, wherein an angle θ between at least one of active surface layer and polarization direction of the laser diode, and a direction perpendicular to a plane which the rays scan by the optical scanning means is $10°≦θ≦80°$.

The present invention is to provide an optical device comprising: at least one of lens or lenses to convert divergent rays from a laser diode to parallel or convergent rays; a slit to regulate luminous energy of the parallel or convergent rays; a before deflection optical system having at least one of lens with different power for main-scanning and sub-scanning; optical scanning means to scan objects to be scanned with the parallel or convergent rays; and an imaging optical system for imaging on the objects to be scanned by passing the scanned rays with the optical scanning means, wherein a polarization device to change a polarization direction of the parallel or convergent rays is provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 13A and 13B show schematic views describing a principle for efficient use of luminous energy (energy) and prevention of sidelobe by optimized opening of a stop of the optical scanning device shown in FIG. 2. FIG. 13A shows a beam intensity distribution in the case of no optical aberration, and FIG. 13B a graph of a beam intensity distribution in the case of accompanied optical aberration;

FIG. 14 shows a graph of changes in transmitted ray passing through a lens by inclination (rotation) of the polarization direction of the laser beam from an individual laser device of the optical scanning device shown in FIG. 2 in a perpendicular direction to the scanning plane;

DETAILED DESCRIPTION OF THE INVENTION

One of embodiments of an optical scanning device of the present invention, and an image forming device using the optical scanning device will be described in details below, referring to drawings.

Figure 1:
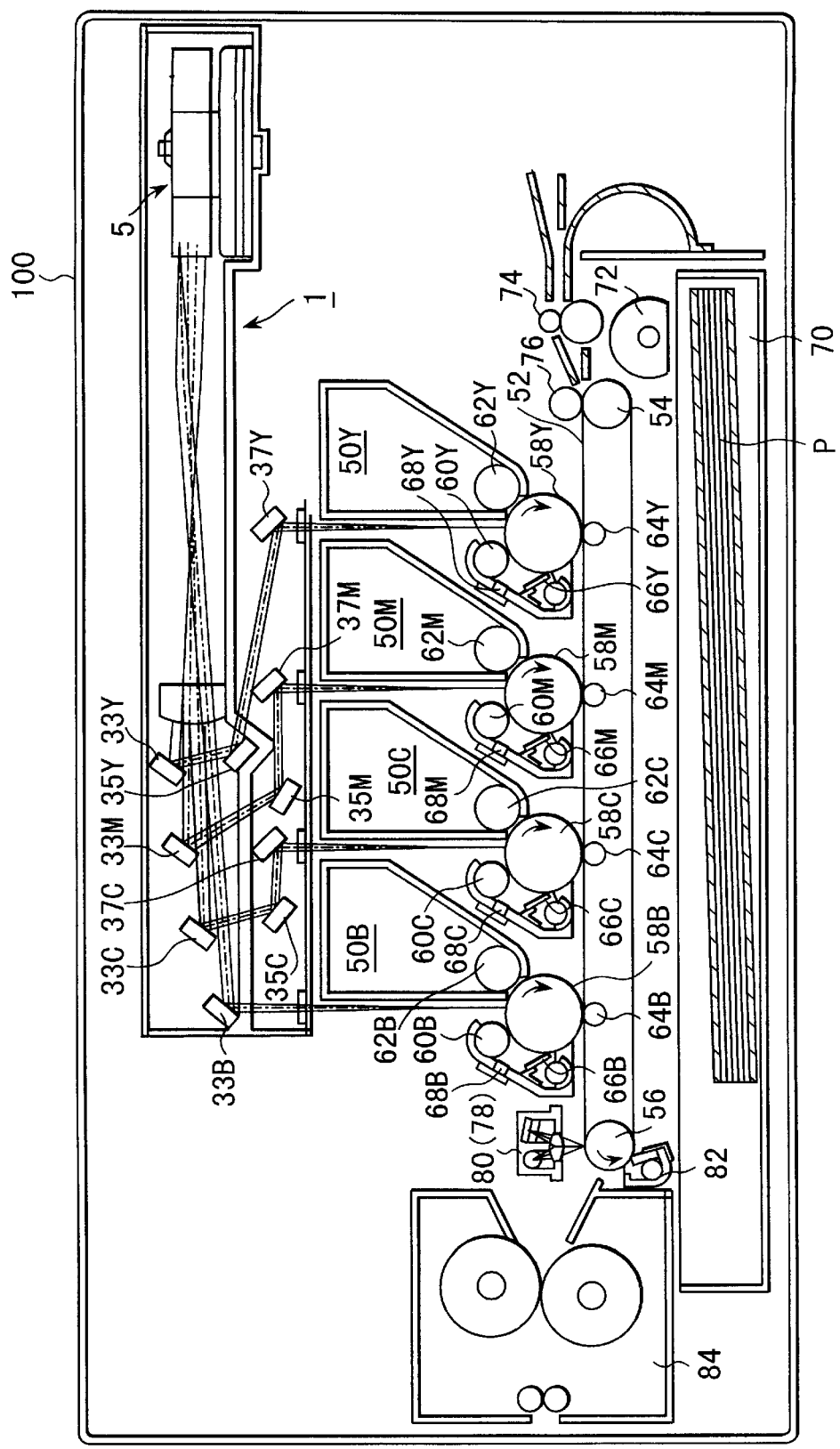
FIG. 1 shows a schematic sectional view of an image forming device using a multi-beam optical scanning device which is an embodiment of the present invention.

FIG. 1 shows a transfer type color image forming device using the multi-beam optical scanning device of the embodiment of the present invention. Usually, in this kind of color image forming devices, various kinds of devices form four kinds of image data after color separation every color components of Y (Yellow), M (Magenta), C (Cyan), B (Black); and images every color component are formed corresponding to each of Y, M, C, and B, using four sets of devices. Then, image data of each color component and devices corresponding to each image data are identified by giving Y, M, C, and B to each reference number.

As shown in FIG. 1, an image forming device 100 comprises a first to fourth image formation part 50Y, 50M, 50C, and 50B by which images are formed every color component after color separation, that is, Yellow (Y), Magenta (M), Cyan (C), and Black (B).

The image formation parts 50Y, 50M, 50C and 50B are arranged in series under the optical scanning device 1 in the order of 50Y, 50M, 50C and 50B, corresponding to a position where laser beams LY, LM, LC and LB are emitted corresponding to each color component image, through third mirrors 37Y, 37M, 37C, and a first mirror 33B of a multi-beam optical scanning device 1 described later referring to FIG. 2.

A transportation belt 52 to carry images formed by each of the image formation part 50 (Y, M, C, or B) is arranged under each the image formation part 50 (Y, M, C, or B).

The belt 52 is stretched between a belt drive roller 56 and a tension roller 54 rotated in the direction of the arrow by a motor not shown in the figure, and rotated at a predetermined speed in the direction where a belt drive roller 56 is rotated.

The image formation part 50 (Y, M, C, and B) includes photosensitive drums 58Y, 58M, 58C each formed cylinder like and rotates in the direction of the arrow, and 58B as image-carrying bodies to form electrostatic latent image corresponding to images.

Around each photosensitive drums 58 (Y, M, C, and B), the following are arranged, electrification devices 60Y, 60M, 60C, and 60B to provide the surface of the photosensitive drums 58 (Y, M, C, and B) with predetermined electric potential, development devices 62Y, 62M, 62C, and 62B to function as development means which perform developing by supplying toners having colors corresponding to electrostatic latent images formed on the surface of the photosensitive drums 58 (Y, M, C, and B), the transfer devices 64Y, 64M, 64C, and 64B, which are arranged opposing to the photosensitive drums 58 (Y, M, C, and B), and put the belt 52 between the each photosensitive drums and each transfer devices, and transported with the transportation belt 52, to transfer toner images of each of the photosensitive drums 58 (Y, M, C, and B) on the transportation belt 52, or the recording medium is set on the belt 52, that is, a recording paper sheet P, cleaners 66Y, 66M, 66C, and 66B to remove remaining toner remained on the photo-sensitive drums 58 (Y, M, C, and B) after transfer of toner images through the transfer devices 64 (Y, M, C, and B), and removers of electricity 68Y, 68M, 68C, and 68B to remove remaining electric potential remained on the photosensitive drums 58 (Y, M, C, and B) after transfer of toner images through the transfer devices 64 (Y, M, C, and B).

Laser beams LY, LM, LC, and LB, guided by each mirror 37Y, 37M, 37C, and 33B of the optical scanning device 1, and composed from two beams in a sub-scanning direction on the photosensitive drums 58, are respectively applied to between each electrification device 60 (Y, M, C, and B) and each development devices 62(Y, M, C, and B).

The direction in which the laser beams are deflected by the optical deflection device is denoted as a main-scanning direction, and the carrying direction of the recording medium, that is, a direction perpendicular to the main-scanning direction as a sub-scanning direction.

A paper sheet cassette 70 accommodating the recording medium, that is, many paper sheets, to which images formed by each image formation part 50 (Y, M, C, and B) are transferred, are arranged under the transportation belt 52.

An approximately semicircle-shaped delivery roller 72 to pick up from the uppermost part a paper sheet P accommodated in the paper sheet cassette 70 is arranged at the side which is one of ends of the paper sheet cassette 70, and near the tension roller 54. A registration roller 74, which adjusts the tip of one paper sheet P taken out of the cassette 70 to the tip of toner images formed on the photosensitive drum 58B in the image formation part 50B (Black), is arranged between the delivery roller 72 and the tension roller 54.

An absorption roller 76 to provide a predetermined electrostatic absorption power through the registration roller 72 to one paper sheet P transported according to a predetermined timing is arranged between the registration roller 74 and the first image part 50Y, near the tension roller 54 substantially on the outer periphery of the tension roller 54 through the transportation belt 52. And the axes of the tension roller 54 and the absorption roller 76 are arranged in parallel.

Registration sensors 78 and 80 to detect the position of images formed on the transportation belt 52, or a paper sheet P transported with the transportation belt 52 is arranged in an axial direction of the belt drive roller 56 at a predetermined distance at the one end of the transportation belt 52, near the belt drive roller 56, substantially, on the outer periphery of the belt drive roller 56 through the transportation belt 52 (in FIG. 1, only the sensor 80 at the rear part as it shows a front sectional view.).

A transportation belt cleaner 82 to remove toners adhered on the transportation belt 52, or paper leavings is arranged on the transportation belt 52 corresponding to the outer periphery of the belt drive roller 56.

A fixation device 84 to fix toner images transferred on the paper sheet to the paper sheet P is arranged, in the further transportation direction of the paper sheet P after transportation through the transportation belt 52 and separation from the tension roller 56.

Figure 2:
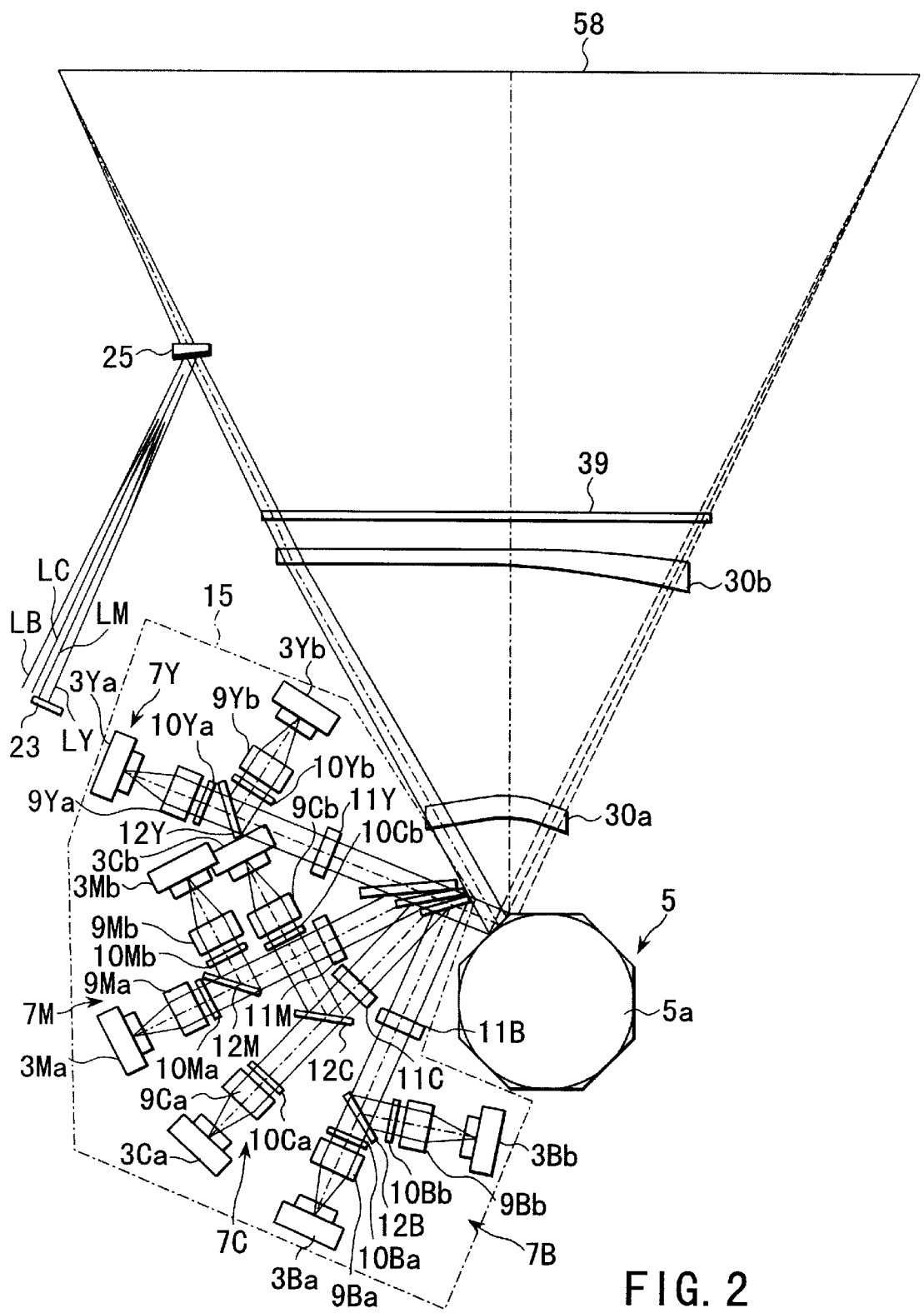
FIG. 2 shows schematic plan view of an arrangement of optical members of an optical scanning device built in an image forming device shown in FIG. 1.

FIG. 2 shows the multi-beam optical scanning device used for the color image forming device shown in FIG. 1. Usually, in the color image forming device shown in FIG. 1, various kinds of devices form four kinds of image data after color separation every color components of Y or Yellow, M or Magenta, C or Cyan, B or Black; and images every color component are formed corresponding to each of Y, M, C, and B, using four sets of devices. Then, image data of each color component and devices corresponding to each image data are identified by giving Y, M, C, or B to each reference number.

As shown in FIG. 2, the multi-beam optical scanning device 1 has only one optical deflection device 5 as a deflection means to deflect laser beams from the laser device as light source at a predetermined line speed toward an image plane arranged at a predetermined position, that is, toward each predetermined position of the photosensitive drum 58Y, 58M, 58C, and 58B of the first to fourth image formation parts 50Y, 50M, 50C, and 50B, shown in FIG. 1.

Hereinafter, a direction of laser beams deflected by the optical deflection device 5 is denoted as a main-scanning direction and a direction perpendicular to the main-scanning direction is denotes as a sub-scanning direction.

The optical deflection device 5 includes a multi-plane mirror having a plurality of, for example, eight plane reflector (planes) arranged in a regular polygon, that is, a polygon mirror 5a, and a motor not shown to rotate the polygon mirror 5a at a predetermined in the main-scanning direction. The polygon mirror 5a is made from, for example, of aluminum. And, each reflection surface of the polygon mirror 5a is provided a surface protection layer such as a SiO$_2$ layer evaporate on a plane having a plane with a rotation direction of the polygon mirror 5a, that is, a plane perpendicular to the main-scanning direction, such as, a section cut along in the sub-scanning direction.

An after deflection optical system 30 with two lenses of a first and second imaging lenses 30a and 30b as a set which gives a predetermined optical characteristics to laser beams deflected in a predetermined direction by the reflection plane of the optical deflection device 5, the system being arranged between the optical deflection device 5 and the image plane, only one horizontal synchronization detector 23 to detect that each individual laser beam of composed beams L (Y, M, C, and B), which pass through the second imaging lens 30b of the after deflection optical system 30, reaches a predetermined position before an area where an image is recorded, and only one set of H-sync mirror 25 to reflect the laser beams L (Y, M, C and B) for horizontal synchronization, which are arranged between the after deflection optical system 30 and the horizontal synchronization detector 23, and reflect a part of 4×2 composed laser beams L (Y, M, C, and B) passing through at least one lens described later in the after deflection optical system 30.

A before deflection optical system between a laser device as light source and the optical deflection device 5 will be described in details.

An optical scanning device 1 contains a first to fourth (M, M is a positive integers, and 4 in this case) light source 3Y, 3M, 3C, and 3B with a number satisfying Ni (i is a positive integer) of, that is, two ($N_1=N_2=N_3=N_4=2$) laser devices of a first and second ones to generate laser beams corresponding to image data through color separation into color components.

The first to 4th light sources of 3Y, 3M, 3C, and 3B, respectively, includes yellow lasers of a first yellow laser 3Ya and a second yellow laser 3Yb emitting laser beams corresponding to Yellow (Y) images, magenta lasers of a first magenta laser 3Ma and a second magenta laser 3Mb emitting laser beams corresponding to Magenta (M) images, cyan lasers of a first cyan laser 3Ca and a second cyan laser 3Cb emitting laser beams corresponding to Cyan (C) images, and black lasers of a first black laser 3Ba and a second black laser 3Bb emitting laser beams corresponding to Black (B) images. Each laser device emits a pair of laser beams LYa and LYb, LMa and LMb, LCa and LCb, and LBa and LBb, respectively for the first to fourth laser beams.

Four sets of the optical systems before deflection 7 (Y, M, C, and B) are arranged between each laser device 3Ya, 3Ma, 3Ca, 3Ba, and the optical deflection device 5, in order to adjust beam spot section shapes of laser beams LYa, LMa, LCa, and LBa from each light source 3Ya, 3Ma, 3Ca, and 3Ba to predetermined shapes.

It will be described, referring to the laser beam LYa of the before deflection optical system 7 (Y) emitted from the first yellow laser 3Ya toward the optical deflection device 5 as a representative.

The divergent laser beam emitted from the first yellow laser 3Ya is given a predetermined convergence by a finite focus lens 9Ya to adjust the beam section shape into a predetermined shape by a stop 10Ya. The laser beam LYa after passing through the stop 10Ya. is guided by the optical deflection device 5 only in the sub-scanning direction through a hybrid anamorphic lens 11Y, while a predetermined convergence is given.

A half mirror 12Y is inserted at a predetermined angle to an optical axis between the finite focus lens 9Ya and the hybrid anamorphic lens 11Y between the finite focus lens 9Ya and the hybrid anamorphic lens 11Y.

In the half mirror 12Y, the laser beam LYb from the second yellow laser 3Yb, which is arranged so as to provide a predetermined beam distance in the sub-scanning direction to the laser beam LYa from the first yellow laser 3Ya, is entered into a plane to which the laser beam LYa from the first yellow laser 3Ya enters, and the opposite plane, in the sub-scanning direction to the laser beam LYa from the first yellow laser 3Ya at a predetermined beam distance. And the finite focus lens 9Yb and the stop 10Yb to give a predetermined convergence to the laser beam LYb from the second yellow laser 3Yb are arranged between the second yellow laser 3Yb and the half mirror 12Y.

Each laser beam LYa, and LYb, which have a predetermined beam distance in the sub-scanning direction, are substantially composed to one laser beam through the half mirror 12Y are guided to the optical deflection device 5 after passing through the laser composition mirror unit 13 described later, referring to FIGS. 8A and 8B.

As similarly shown below, for M or the magenta, a finite focus lens 9Ma, a stop 10Ma, a hybrid anamorphic lens 11M, a half mirror 12M, a second magenta laser 3Mb, a finite focus lens 9Mb, and a stop 10Mb are arranged at a predetermined position between the first magenta laser 3Ma and the laser composition mirror unit 13; for C or cyan, a finite focus lens 9Ca, a stop 10Ca, a hybrid anamorphic lens 11C, a half mirror 12C, a second magenta laser 3Cb, a finite focus lens 9Cb, and a stop 10Cb are arranged at a predetermined position between the first cyan laser 3Ca and the laser composition mirror unit 13; and for B or black, a finite focus lens 9Ba, a stop 10Ba, a hybrid anamorphic lens 11B, a half mirror 12B, a second magenta laser 3Bb, a finite focus lens 9Bb, and a stop 10Bb are arranged at a predetermined position between the first cyan laser 3Ba and the laser composition mirror unit 13. Furthermore, each light source 3 (Y, M, C, and B), the before deflection optical system 7 (Y, M, C, and B) and the laser composition mirror unit 13 are retained as one block, for example, by a retaining member 15 made of aluminum alloy and the like.

A single lens where a aspheric glass lens or spherical glass lens, and a UV hardened plastic aspherical lens not shown are pasted together is used for finite focus lens 9 (Y, M, C, and B)a, and 9 (Y, M, C, and B)b.

Figure 3:
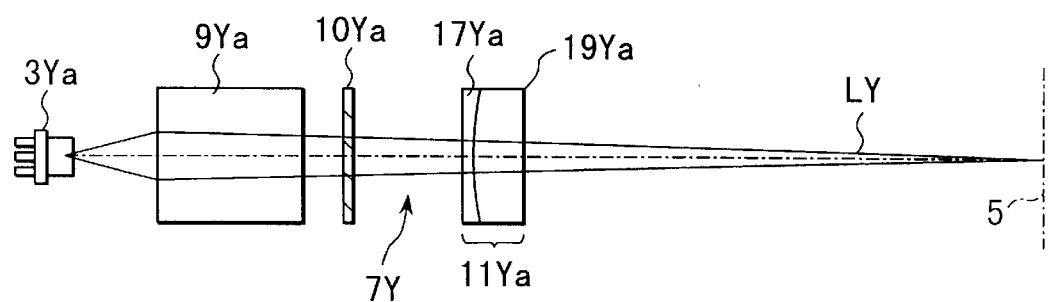
FIG. 3 shows a partial section view of an optical scanning device shown in FIG. 2 cut along the optical axis of the system between a first light source and an optical deflection device.

FIG. 3 shows a partial section view of an optical path between the half-mirror 12 of the before deflection optical system 7 and a reflection plane of the optical deflection device 5, viewed from the sub-scanning direction, and eliminating the mirrors and the like. FIG. 3 shows only optical components for one laser beam LY (LYa) as a representative.

The hybrid anamorphic lens 11(Y) is made of, free curved surface anamorphic lens 17 (Y) made of plastic such as PMMA (polymethyl methacylate), and a cylinder lens 19 (Y) made of glass such as FD60. Moreover, the curvatures of each lens in the sub-scanning direction are substantially the same.

A free and curved surface anamorphic lens 17 (Y) made of PMMA is configured not to give convergence to the optical beams. That is, the emitting plane is configured to be of a plane or as a concave one with a predetermined curvature. Further, in an example shown in FIG. 3, the emitting plane of the free and curved surface anamorphic lens 17 (Y) is configured to be as concave, and given negative power.

A cylinder lens 19 (Y) made of glass has substantially flat incidence plane, a plane perpendicular to the incidence plane, and an emitting plane of a cylindrical plane with a predetermined curvature.

The free and curved surface anamorphic lens 17 (Y) and the cylinder lens 19 (Y) are made into the hybrid anamorphic lens 11(Y) by bonding between the emitting plane of the free and curved surface anamorphic lens 17 (Y) and the incidence plane of the cylinder lens 19 (Y), or by pressure from a predetermined direction toward a positioning member not shown in the figures. And the incidence plane of the cylinder lens 19 (Y), and the free and curved surface anamorphic lens 17 (Y) may be made into the hybrid anamorphic lens 11(Y) as one block.

Further, the free and curved surface anamorphic lens 17 (Y) made of plastic is configured to surround the plane of the cylinder lens 19 (Y) with a part of the plane exposed.

Optical numeric data of the before deflection optical system 7 will be described below, referring to Table 1 to Table 3.

TABLE 1

Lens data for optical system before deflection

| Angle in rad. | | | Radius of inscribing circle of Reflection plane of optical deflection devices 33 | |
|---|---|---|---|---|
| Effective oscillation angle | | | .476 Center of Rotation of reflection plane of optical deflection device (26.31, 20.10) | |
| Separation angle | | | .698 | |
| | | For yellow and black | | |
| Curvature | | | | |
| Main scanning | Sub scanning | Thickness | Material | Others |
| — | — | 11.882 | Air | f = 11.55 |
| Plane | Plane | 52.331 | Air | NA = 0.33 |
| Plane | 2.711E-2 | 0.1 | PMMA | |
| Plane | Plane | 5.0 | Glass | n = 1.922 |
| | | 65.879 | Air | |

Deviation from optical axis on reflection plane of optical deflection device −3.344
Inclination from optical axis on reflection plane of optical deflection device 2.828E-2
Eccentricity of main rays entering to cylinder lens 17  −3.567E-4 (opposite sign for rays b)
Inclination of main rays entering to cylinder lens 17 −8.436E-5

TABLE 2

Lens data for optical system before deflection

| Angle in rad. | | | Radius of inscribing circle of reflection plane of optical deflection devices 33 | |
|---|---|---|---|---|
| Effective oscillation angle | | | .476 Center of Rotation of reflection plane of optical deflection device (26.31, 20.10) | |
| Separation angle | | | .698 | |
| | | For magenta | | |
| Curvature | | | | |
| Main scanning | Sub scanning | Thickness | Material | Others |
| — | — | 11.882 | Air | f = 11.55 |
| Plane | Plane | 56.664 | Air | NA = 0.33 |
| Plane | 2.711E-2 | 0.1 | PMMA | |
| Plane | Plane | 5.0 | Glass | n = 1.922 |
| | | 65.802 | Air | |

Deviation from optical axis on reflection plane of optical deflection device −1.562
Inclination from optical axis on reflection plane of optical deflection device  1.213E-2
Eccentricity of main rays entering to cylinder lens 17  −3.698E-5 (opposite sign for rays b)
Inclination of main rays entering to cylinder lens 17 −8.679E-5

TABLE 3

Lens data for optical system before deflection

| | |
|---|---|
| Angle in rad. | Radius of inscribing circle of reflection plane of optical deflection devices 33 |
| Effective oscillation angle | .476 Center of Rotation of reflection plane of optical deflection device (26.31, 20.10) |
| Separation angle | .698 |
| | For cyan |

| Curvature | | | | |
|---|---|---|---|---|
| Main scanning | Sub scanning | Thickness | Material | Others |
| — | — | 11.882 | Air | f = 11.55 |
| Plane | Plane | 57.728 | Air | NA = 0.33 |
| Plane | 2.711E-2 | 0.1 | PMMA | |
| Plane | Plane | 5.0 | Glass | n = 1.922 |
| | | 65.790 | Air | |

Deviation from optical axis on reflection plane of optical deflection device −.537
Inclination from optical axis on reflection plane of optical deflection device 3.788E-3
Eccentricity of main rays entering to cylinder lens 17 −4.448E-3 (opposite sign for rays b)
Inclination of main rays entering to cylinder lens 17 −9.950E-5

As is evident from TABLES 1 to 3, the same lenses may be used for any color components as a single lens, in the finite focus lens 9 and the hybrid anamorphic lens 11 corresponding to each color component. And, for the before deflection optical system 7Y, corresponding to Y (yellow), and the system 7B to B (black) have substantially the same lens arrangement. Further, the before deflection optical system 7M corresponding to M (magenta), and the system 7C to C (cyan) have larger distance between the finite focus lens 9 and the hybrid anamorphic lens 11, comparing with that of the optical systems before deflection 7Y and 7B.

Figure 4:
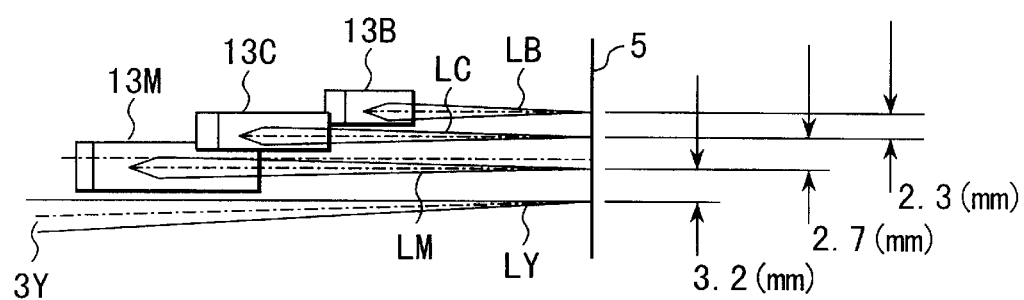
FIG. 4 shows a partial sectional view of the optical scanning device shown in FIG. 2 in the sub-scanning direction, and a schematic view of positions of a first to forth laser beams on a mirror surface of the optical deflection device.

FIG. 4 shows laser beams LM, LC, and LB (LM including of LMa and LMb; LC of LCa and LCb, and LB of LBa and LBb) are reflected from the reflection planes of each laser composition mirror 13M, 13C, and 13B to the optical deflection device 5 in the sub-scanning direction perpendicular to the rotation axis of the reflection plane of the optical deflection device 5, referring to each of the optical systems before deflection 7 (Y, M, C, and B) shown in FIG. 3, and Tables 1 to 3.

As is evident from FIG. 4, each of laser beams LY, LM, LC, and LB is guided in a parallel direction to the rotation axis of the reflection plane of the optical deflection device 5 at a mutually different distance toward the optical deflection device 5. Moreover, laser beams LM and LC are guided toward each reflection plane of the optical deflection device 5, asymmetrically inserting a plane having a center of the reflection plane in the sub-scanning direction, that is, a plane perpendicular to the rotation axis of the reflection plane of the optical deflection device 5 and a system optical axis of the optical scanning device 1. Mutual distances between laser beams LY, LM, LC, and LB on each reflection plane of the optical deflection device 5 are as follows: 3.20 millimeter (hereinafter, abbreviated as mm) between LY-LM, and 2.70 mm between LM-LC, and 2.30 mm between LC-LB.

Figure 5:
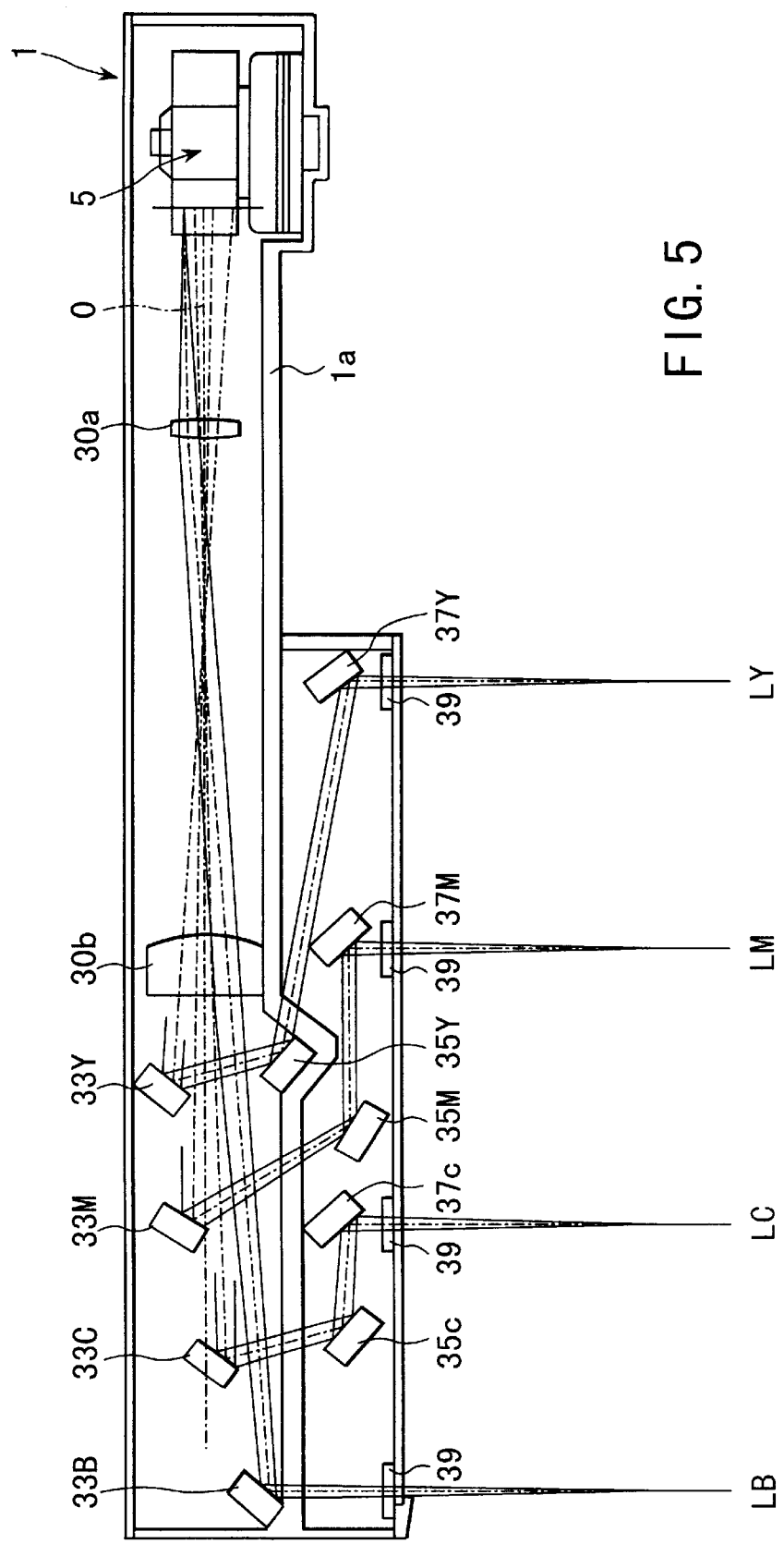
FIG. 5 shows a schematic sectional view of the optical deflection device shown in FIG. 2 cut at a position of a deflection angle of 0° of the optical deflection device.

FIG. 5 shows optical members arranged from the optical deflection device 5 of the optical scanning device 1 to each photosensitive drum 58, that is, the image planes viewed from the sub-scanning direction at a position with a zero deflection angle of the optical deflection device 5.

As shown in FIG. 5, there are arranged between the second imaging lens 30b of the after deflection optical system 30 and the image plane, a first plate-like mirrors 33 (Y, M, C, and B) to reflect 4×2 laser beams L (Y, M, C, and B) toward the image plane (33B) or next mirrors (33Y, 33M and 33C); and a second and a third mirrors 35Y, 35M, and 35C, and 37Y, 37M, and 37C to further reflect the laser beams LY, LM, and LC reflected from the first mirrors 33Y, 33M, and 33C. As is evident from FIG. 5, the laser beam LB corresponding to the B (black) image is reflected by the first mirror 33B only, and then guided to the image plane without any reflection of the other mirrors.

The first and second imaging lenses 30a and 30b, the first mirror 33 (Y, M, C, and B), and the second mirror 35Y, 35M, and 35C, are fixed an intermediate base 1a of the optical scanning device 1 respectively, for example, on a plurality of fixed members not shown and made as one block by bonding.

The third mirror 37Y, 37M, and 37C is movably arranged at least in a direction related with the vertical direction to the mirror plane through a fixing rib and an inclination adjusting mechanism described later, referring to FIG. 10.

Pieces of dust prevention glass 39 (Y, M, C, and B) for dust prevention of inner volume of the optical scanning device 1 are further arranged at a position between the third mirror 37Y, 37M, 37C and the first mirror 33B, and the image plane, where 4×2=8 laser beams L (Y, M, C, and B), which are reflected through each mirror 33B, 37Y, 37M, and 37C, are emitted.

Then, the optical characteristics between the optical system before deflection 7 and the after deflection optical system 30 will be described in details below.

As the after deflection optical system, that is, one set of two lenses of the first and the second imaging lenses 30a and 30b are made of plastic, for example, PMMA, It has been known that the refractive index n changes from 1.4876 to 1.4789 with a change in the surrounding temperature, for example, from 0° C. to 50° C. In this case, an imaging plane where a laser beam passing through the first and second imaging lenses 30a and 30b are actually converged, that is, the imaging position in the optical axis direction moves by about +/−12 mm.

Thereby, the changes in moving of the imaging plane caused by changes in the refractive index due to the temperature fluctuation may be controlled to about +/−0.5 mm by building in a lens made of the same member as that of the lenses used for the after deflection optical system 30 with the best curvature. That is, optical aberration in the optical axis direction caused by changes in the refractive index due to temperature fluctuation of lenses of the after deflection optical system 30 may be corrected to smaller, comparing with conventional optical system using glass material lenses for the before deflection optical system 7, and plastic lenses for the after deflection optical system 30.

Figure 6:
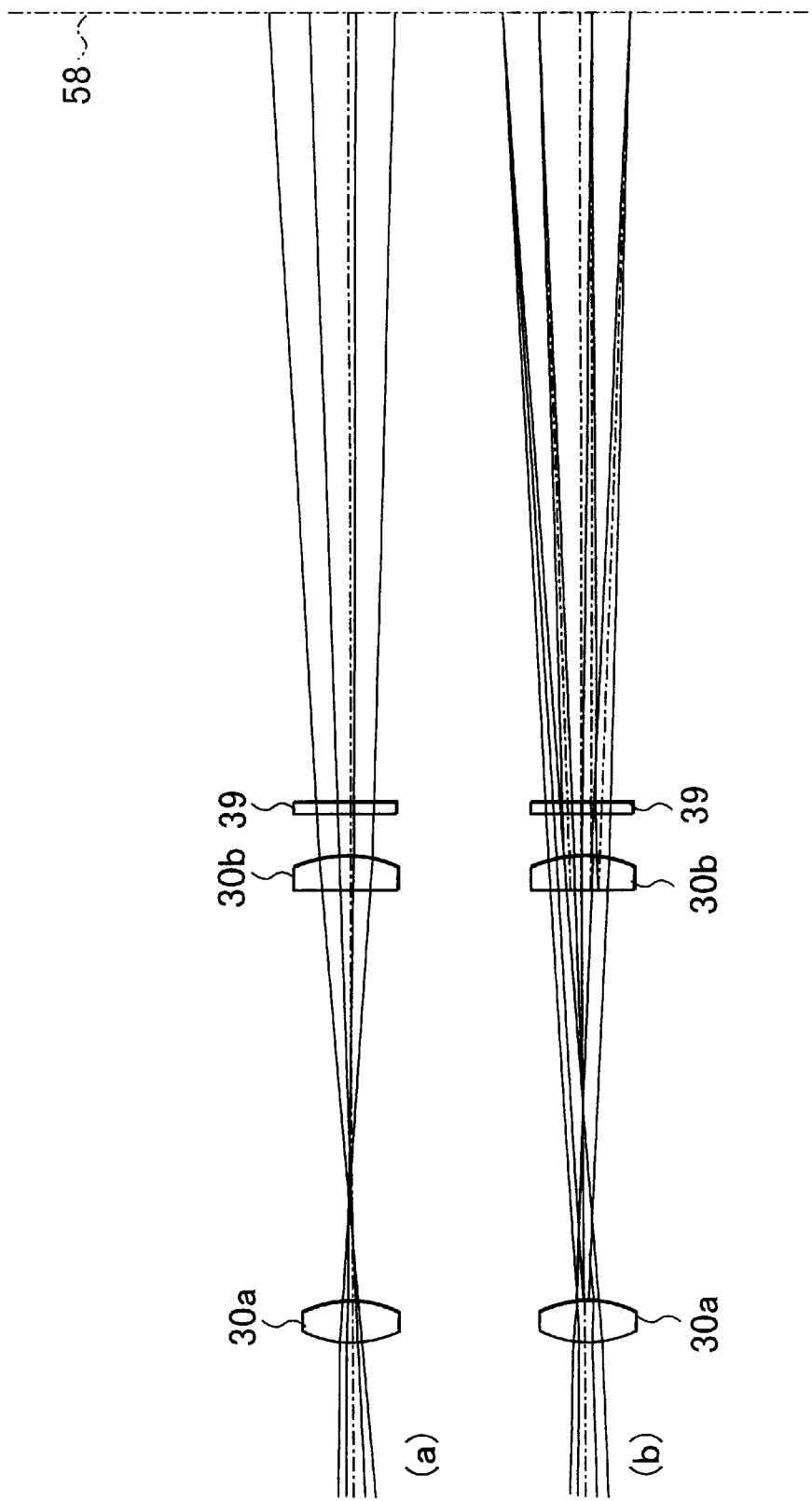
FIG. 6 shows an elevation view of optical paths cut at a position of a deflection angle of 0 degrees of the optical scanning device shown in FIG. 5, eliminating mirrors and the optical scanning device.

FIG. 6 shows a view of a optical path denoting a relationship between the first to fourth laser beams L (Y, M, C, and B) passing through between the optical deflection device 5 and the image plane shown in FIG. 5, and the system optical axis of the optical scanning device 1 in the sub-scanning direction.

As shown in FIG. 6, the first to fourth laser beams L (Y, M, C, and B) reflected on the reflection plane of the optical deflection device 5 is guided to the image plane, crossing the system optical axis in the sub-scanning direction between the first imaging lens 30a and the second imaging lens 30b, respectively.

Figure 7:
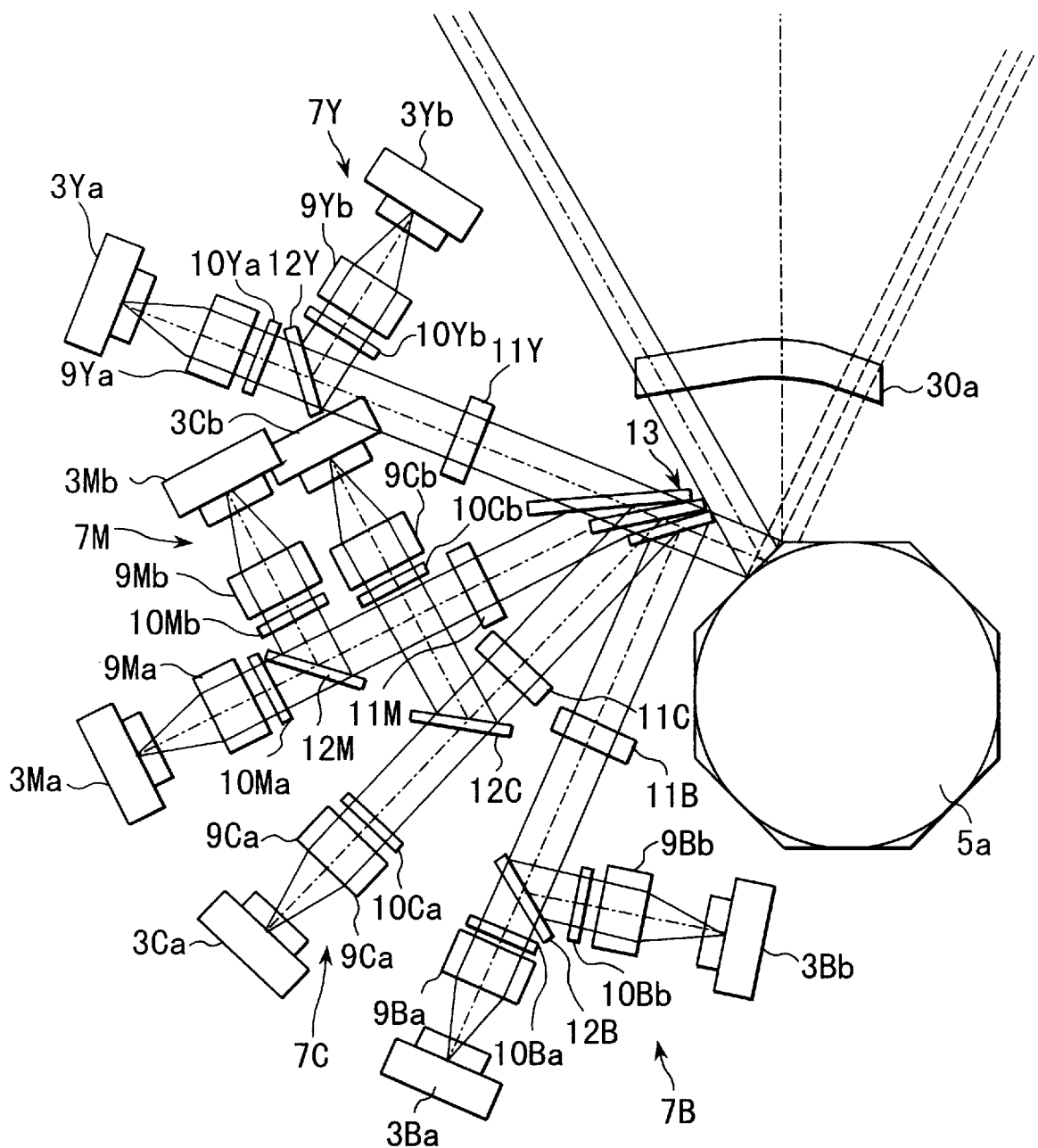
FIG. 7 shows a schematic view of an arrangement of each optical member of the before deflection optical system of the optical scanning device shown in FIG. 2.

FIG. 7 minutely shows an arrangement of each optical member of the before deflection optical system of the optical scanning device shown in FIG. 2 in detail.

As already described referring to FIG. 2, the first to fourth light source 3 (Y, M, C, and B) includes respectively, a set of two lasers of the first yellow laser 3Ya and the second yellow laser 3Yb, the first magenta laser 3Ma and the second magenta laser 3Mb, the first cyan laser 3Ca and the second cyan laser 3Cb, and the first black laser 3Ba and the second black laser 3Bb. And each pair of lasers are arranged in the sub-scanning direction at a predetermined distance corresponding to the beam distance on the image plane described later. Moreover, each pair, that is, sets corresponding to color components are, corresponding to each reflection area of the laser composition mirror block 13 shown in FIGS. 8A and 8B, arranged at a predetermined distance in the sub-scanning direction and in four layers while seen from the sub-scanning direction.

Figure 8A:
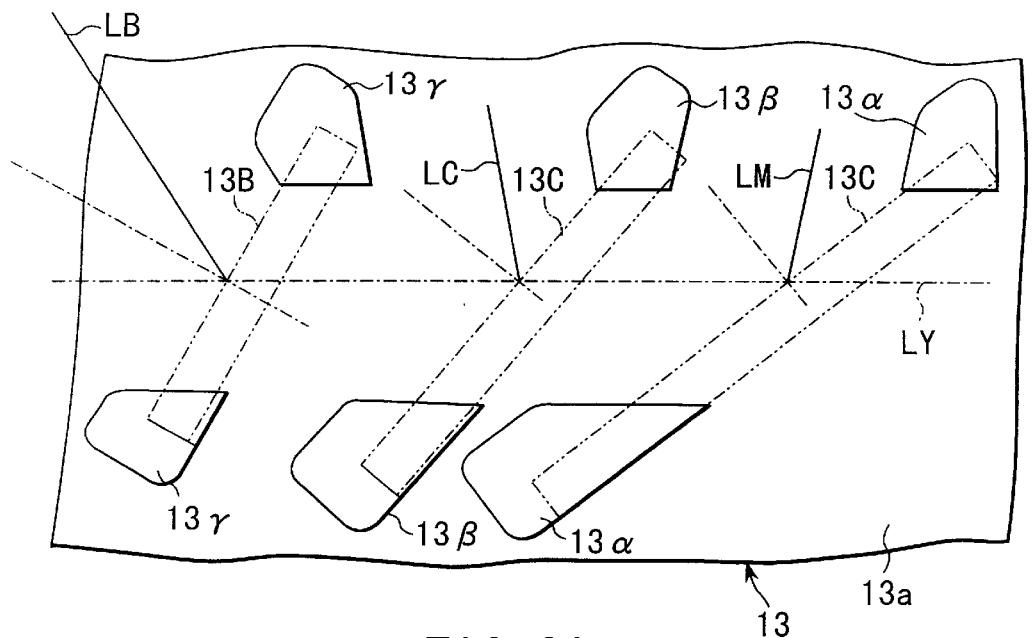
FIGS. 8A and 8B show a plan and a side views of a laser composition mirror unit of the optical scanning device shown in FIG. 2.
Figure 8B:
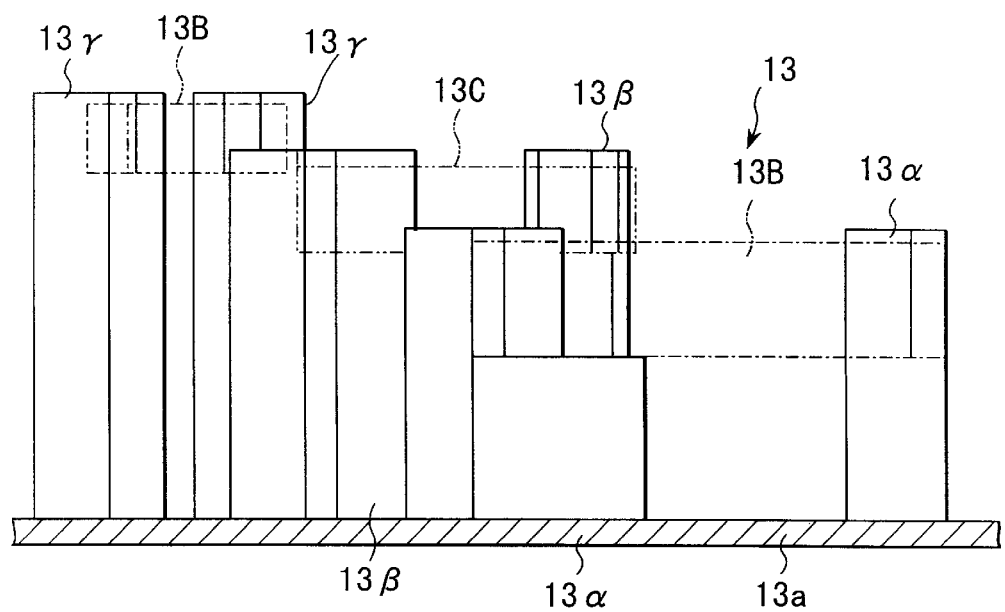

FIGS. 8A and 8B shows the laser composition mirror unit 13 guiding the first to the fourth composed laser beams LY, LM, LC, and LB as one As a laser beam of one bundle of laser beams to each reflection plane of the optical deflection device 5.

The laser composition mirror unit 13 has the first to the third mirror 13M, 13C, and 13B, while the arranged number is less than that of image formable color components (number of colors after color separation) by "1"; a first to a third mirror retaining part 13α, 13β, and 13γ retaining the mirrors 13M, 13C, and 13B, respectively; and a base 13a retaining the retaining part 13α, 13β, and 13γ, respectively. The base 13a, and the retaining part 13α, 13β, and 13γ are made of materials such as aluminum alloy with small coefficient of thermal expansion as one block.

At this time, the light source 3Y, that is, the laser beam LY from the first yellow laser 3Ya and the second yellow laser 3Yb is guided directly to each reflection plane of the optical deflection device 5 as already described. In this case, the laser beam LY is passed to the side of the base 13a from the system optical axis of the optical scanning device 1, that is, between the mirror 13M and the base 13a fixed on the first retaining part 13α.

Now, each laser beam LM, LC, and LB, which is reflected by each mirror 13M, 13C, and 13B of the composition mirror 13, and guided by the optical deflection device 5; and the intensity (luminous energy) of the laser beam LY directly guided by the optical deflection device 5 will be considered.

According to the laser composition mirror unit 13 shown in FIGS. 8A and 8B, the laser beams LM, LC, and LB are reflected by usual mirrors (13M, 13C, and 13B) at an area where the laser beams LM, LC, and LB before entering to each reflection plane of the optical deflection device 5 are separated in the sub-scanning direction, respectively. Therefore, after reflection on each reflection plane (13M, 13C, and 13B), the luminous energy of the laser beams L (M, C, and B) supplied toward the reflection plane of the polygon mirror 5a of the deflection device 5 may be maintained at about 90% or amore of the emitted luminous energy from the finite focus lens 9. Thereby, the output of each laser device may be not only reduced, but also corrected to uniform optical aberration of the ray reaching the image plane, as there is no optical aberration caused by an inclined parallel plane. Then, it may be possible to reduce the size of each laser beam to enable high resolution application. And, the laser beam LY from the laser device 3Y corresponding to Y (yellow) is guided directly to each reflection plane of the optical deflection device 5, independently of any mirrors of the composition mirrors 13, it may be possible to not only reduce the output capacity of the lasers, but also remove the errors in the incidence angle to each reflection plane due to possible mirror (13M, 13C and 13B) reflections of other laser beams reflected by the composition mirror.

Then, referring to FIGS. 2 and 5, the relationship between the laser beams L (Y, M, C, and B) reflected at the reflection plane of the polygon mirror 5a of the optical deflection device 5, the inclinations of laser beams LY, LM, LC, and LB emitted through the after deflection optical system 30 to the outside of the optical scanning device 1, and the mirrors 33B, 37Y, 37M and 37C.

As described above, the laser beams LY, LM, LC, and LB, which are reflected at the polygon mirror 5a of the optical deflection device 5, and provided with a predetermined optical aberration characteristics by the first or second imaging lenses 30a and 30b, are reflected through the first mirrors 33Y, 33M, 33C, and 33B in a predetermined direction, respectively.

At this time, the laser beam LB, after reflection at the first mirror 33B, is guided directly to the photosensitive drum 58B through the dust prevention glass 39B. On the contrary, the other laser beams LY, LM, and LC are guided to the second mirrors 35Y, 35M, and 35C, respectively, reflected toward the third mirrors 37Y, 37M, and 37C at the second mirrors 35Y, 35M, and 35C, further reflected at the third mirrors 37Y, 37M, and 37C, and imaged on each photosensitive drum at approximately equal distances through the dust prevention glass 39Y, 39M, and 39C, respectively. In this case, the laser beam LB emitted at the first mirror 33B, and the laser beam LC adjoining the beam LB are also imaged on the photosensitive drum 58B, and 58C, respectively.

Further, the laser beam LB is emitted toward the photosensitive drum 58B from the optical scanning device 1, only through reflection at the mirror 33B after deflection a the polygon mirror 5a. Thereby, it may be possible to secure the laser beam LB guided, substantially, only by one mirror 33B.

The laser beam LB is useful as a reference beam for relative correction of the other laser beams L (Y, M, and C), while the correction is performed for fluctuations in the various kinds of optical aberration characteristics of the images on the imaging planes, or the bending of the main-scanning beam, which are increased (multiplied) according to the number of mirrors, when there are a plurality of mirrors on the optical paths.

When there are a plurality of mirrors on the optical path, it may be preferable to set the number of mirrors used for each laser beam LY, LM, LC, and LB to the odd number or the even number. That is, as shown in FIG. 5, the number of mirrors in the after deflection optical system for the laser beam LB is 1 (odd number), excluding the reflection plane of the polygon mirror 5a of the optical deflection device 5, and the number of mirrors in the after deflection optical system for the laser beams LC, LM, and LY is three (odd number), excluding the polygon mirror 5a. Now, when the second mirror 35 is assumed to be eliminated for any one of laser beams LC, LM, and LY, the bending direction, due to inclination of the lenses, of the main-scanning laser beams passing through the optical path (the number of mirrors is an even number) without the second mirror 35 is opposite to the bending direction of the main-scanning beams due to inclinations of lenses for other laser beams, that is an odd number of mirrors and the like to cause color deviation harmful for reproduction of predetermined colors.

Thereby, for reproduction of predetermined colors by overlapping 4×2 laser beams LY, LM, LC, and LB, the number of mirrors arranged on the optical paths of each laser beam LY, LM, LC, and LB is substantially set to the odd number or the even number.

Figure 9:
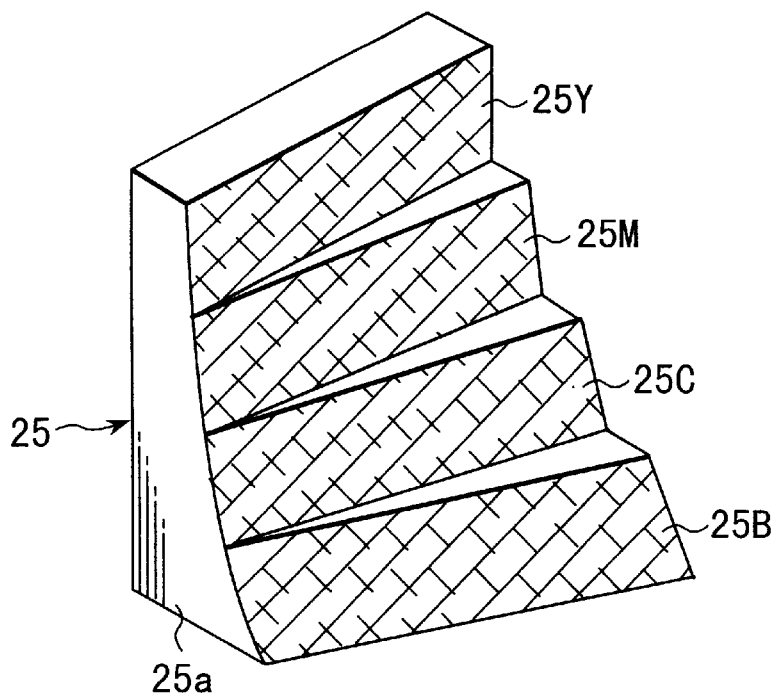
FIG. 9 shows a schematic perspective view of mirrors for horizontal synchronization detection of the optical scanning device shown in FIG. 2.

FIG. 9 shows the H-sync mirror for horizontal synchronization in detail.

According to FIG. 9, the H-sync mirror 25 for the horizontal synchronization, has a mirror block 25a retaining as one block the first to the fourth mirror plane 25Y, 25M, 25C, 25B, and mirrors 25 (Y, M, C, and B) which are configured at different angles for the main-scanning and the sub-scanning directions so as to reflect the composed laser beams LY, LM, LC, and LB to the horizontal, synchronization detector 23 at different timings in the main-scanning direction, and at the substantially same height on the horizontal synchronization detector 23 in the sub-scanning direction.

The mirror block 25a is formed, using, for example, PC (polycarbonate) with glass. And, the mirrors 25 (Y, M, C, and B) are formed with metal deposition of, for example, aluminum at a position corresponding to the block 25a formed at a predetermined angle.

Thus, it may be possible not only for the laser beams LY, LM, LC, and LB deflected by the reflection plane of the optical deflection device 5 to enter to the same detection position of one detector 23, but also to remove the deviations in the horizontal synchronization signals caused by the sensitivities of each detector, or position deviations, which are problems for arrangement of a plurality of detectors. Further, the laser beams LY, LM, LC, and LB are entered to the horizontal synchronization detector 23a four times in total per one line in the main-scanning direction by the mirror 25 for horizontal synchronization, and, obviously, the horizontal synchronization signals are obtained two times per one beam. Moreover, the mirror block 25a is designed for the mirror plane of the mold to be made by cutting from one block, and configured to be taken out form the mold without undercutting.

Figure 10:
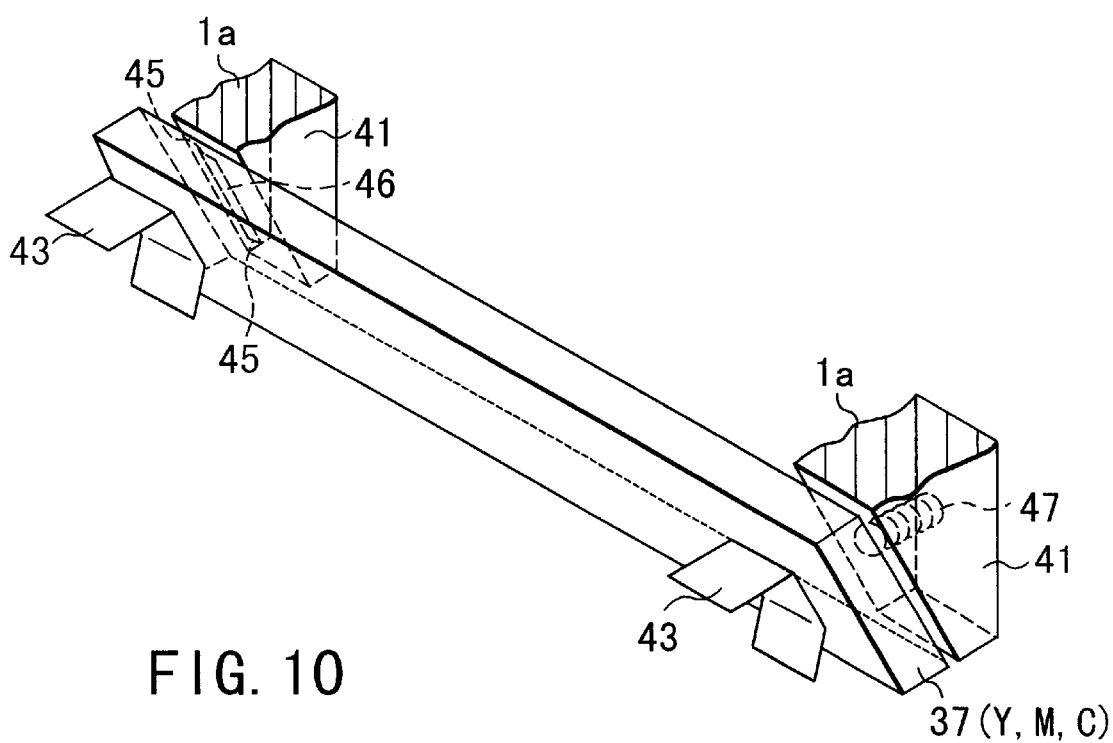
FIG. 10 shows a schematic perspective view of an adjustment mechanism of a plate like mirror of the optical scanning device shown in FIG. 2.

FIG. 10 shows a supporting mechanism of the third mirrors 37Y, 37M and 37C.

According to FIG. 10, the third mirrors 37 (Y, M, and C) are retained by fixed parts 41 (Y, M, and C) formed with an intermediate base 1a as one block, and mirror press plate springs 43 (Y, M, and C) opposing to the fixed parts 41 (Y, M, and C) at predetermined positions of the intermediate base 1a of each optical scanning device.

A pair of the fixed parts 41 (Y, M, and C) are formed at both ends (in the main-scanning direction) of the mirrors 37 (Y, M, and C), respectively. Two projections 45 (Y, M, and C) to retain the mirrors 37 (Y, M, and C) at two points are formed at the other end of the fixed parts 41 (Y, M, and C), respectively. But, the two projections 45 (Y, M and C) may be ribs 46 (Y, M, and C) as shown by the dotted line in FIG. 10. Lockscrews 47 (Y, M, and C) to support the mirrors retained with the projections 45 (Y, M, and C) movably in the vertical direction or along the optical axis are arranged in the other fixed part 41 (Y, M, and C).

As shown in FIG. 10, the mirrors 37 (Y, M, and C) are moved in the vertical direction or the direction of the optical axis, having the projections 45 (Y, M, and C) as support, by movement of the lockscrews 47 (Y, M, and C) in a predetermined direction. And, according to the above method, it may be possible to correct the inclination in the main-scanning direction, that is, the bending of the main-scanning beams, but impossible to correct the deviations in the distances between the composed laser beams LY, LM, LC, and LB in the sub-scanning direction. Therefore, the deviations in the distances in the sub-scanning direction may be corrected by modifications in the horizontal writing timing described below referring to FIGS. 11 and 12.

Figure 11:
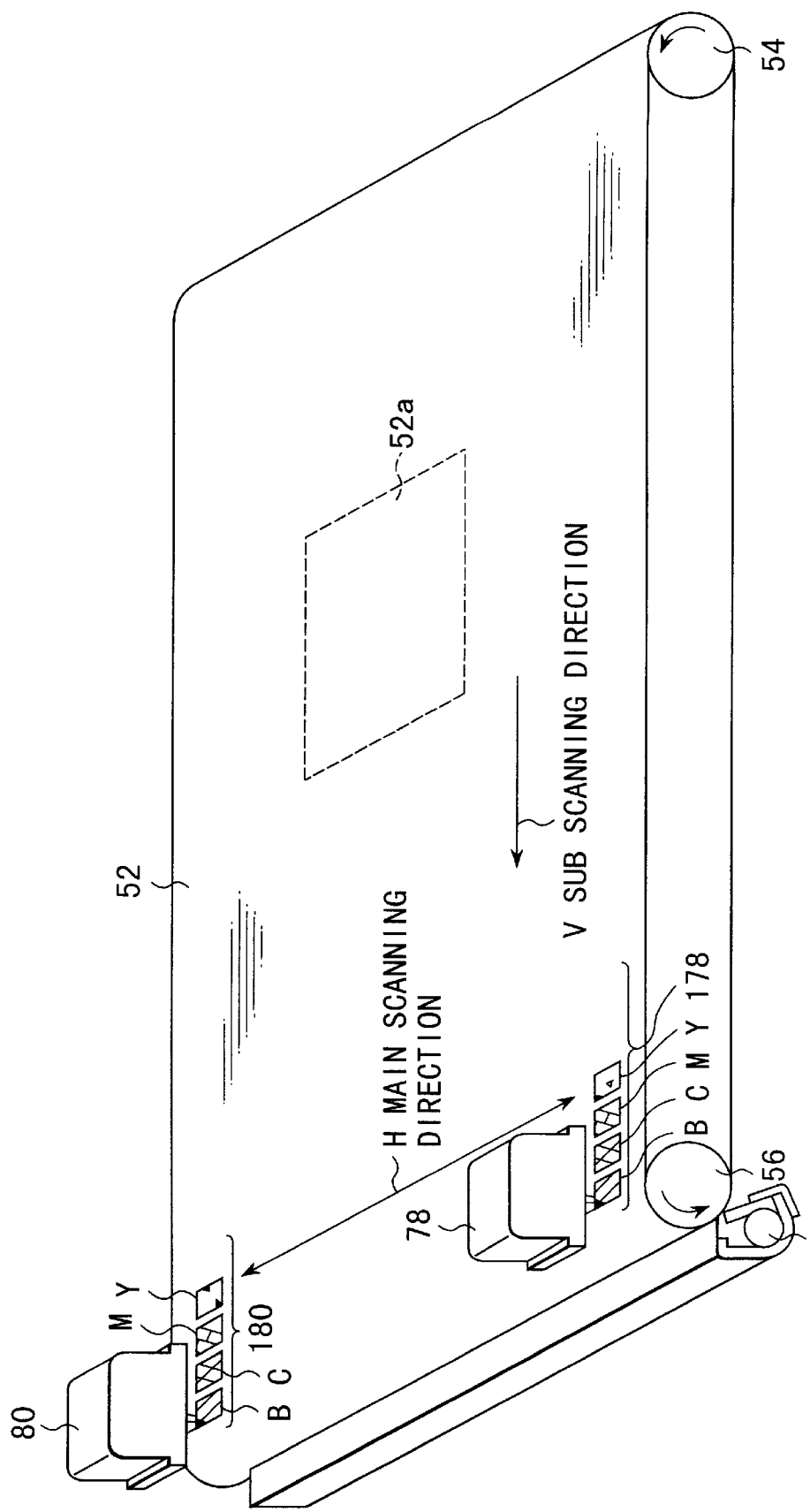
FIG. 11 shows a schematic view of a principle for registration correction of the image forming device shown in FIG. 1.

FIG. 11 shows a schematic perspective view of a part near the transportation belt of the image forming device shown in FIG. 1. As described above, the registration sensors 78, and 80 are arranged at a predetermined distance H in the width direction the transportation belt 52, that is, in the main-scanning direction. And the line (virtual) connecting the centers of the registration sensors 78 and 80 is defined to be approximately in parallel to the axis lines of the photosensitive drum 58 (Y, M, C, and B) of the image formation parts 50 (Y, M, C and B). The line connecting the centers of registration sensors 78 and 80 are arranged exactly in parallel to the photosensitive drum 58B of the image formation part 58B.

Figure 12:
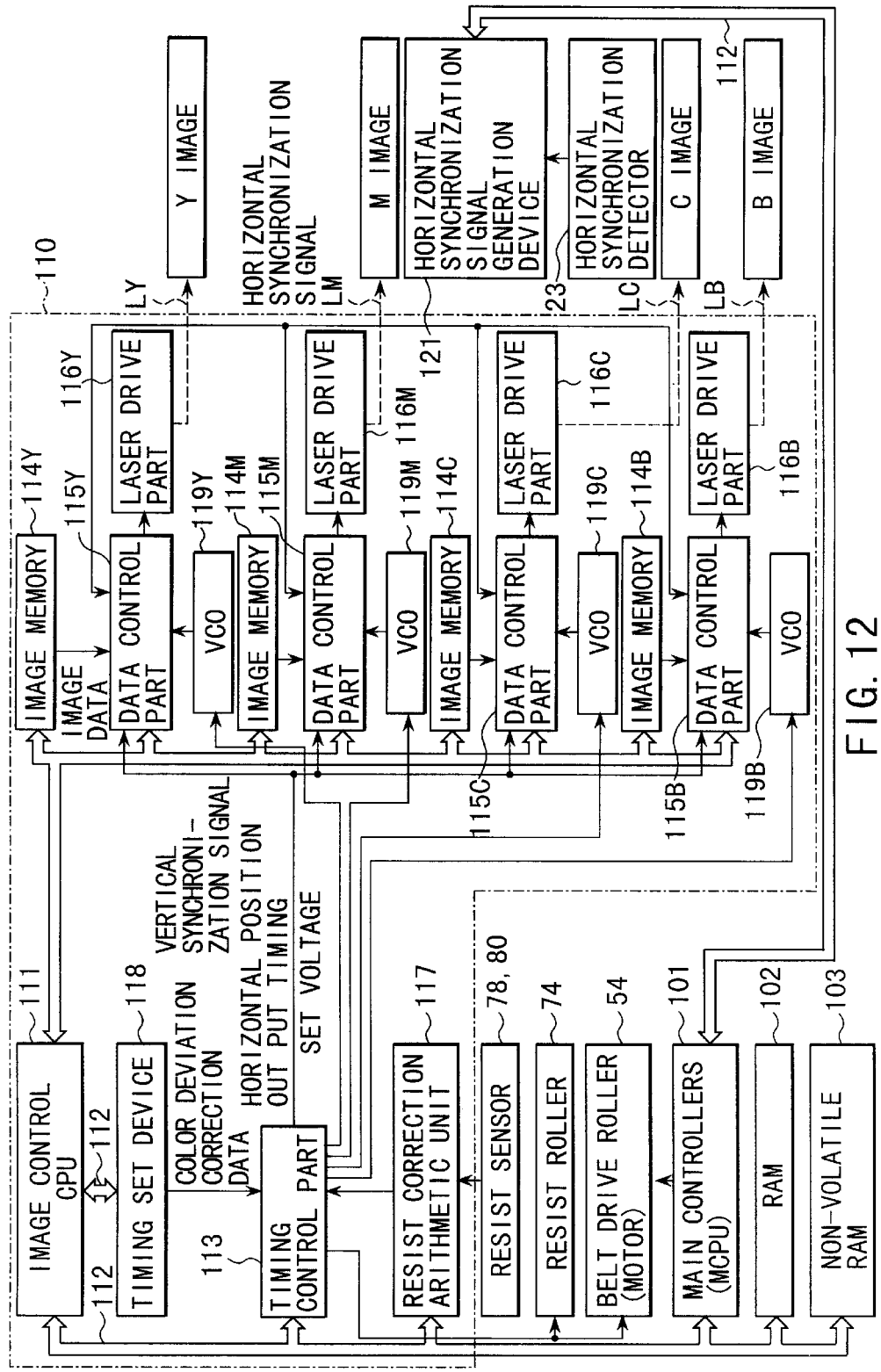
FIG. 12 shows a block diagram of an image control part of the image forming device shown in FIG. 1.

FIG. 12 shows a schematic block diagram of he image control part to control operation to form images by the image forming device shown in FIG. 1.

The image forming device 100 includes an image control part 110.

The image control part 110 has an image control CPU 111, a timing control part 113, and a plurality of control units such as a data control part 115Y, 115M, 115C, and 115B corresponding to each color component. And the image control CPU 111, the timing control part 113, and the data control parts 115 (Y, M, C, and B) are mutually connected through a bus line 112, respectively.

Further, the image control CPU 111 is connected through the bus line 112 to a main control device 101 to control operation of machine components such as motors, or rollers, and values of voltages or currents applied to electrical components such as electrification devices 60 (Y, M, C, and B) and developing devices (Y, M, C, and B), or transfer devices 64 (Y, M, C, and B). And, a ROM (read-only memory) not shown in the figures to store initialed data or test patterns, and the like to initialize the device 100, a RAM102 (random access memory) to temporarily store correction data and the like calculated according to input image data or output of the registration sensors 78 and 80, a nonvolatile memory 103 to store various kinds of correction data required by adjustment modes described later, and the like are connected to the main control device 101.

Image memories 114Y, 114M, 114C, and 114B to store image data corresponding to each color component, laser drive parts 116 (Y, M, C, and B) for energisation of the corresponding light source 3 (Ya, Yb, Ma, Mb, Ca, Cb, Ba, and Bb) in order to irradiate laser beams toward the photosensitive drums 58 (Y, M, C, and B) of the image formation parts 50 (Y, M, C, and B), based on the image data memorized in the image memories 114 (Y, M, C, and B), a registration correction arithmetic unit 117 for calculation of an amount of timing corrections, by which images are written by the composed laser beams LY, LM, LC, and LB based on output signals from the registration sensors 78, and 80, based on the output signals from the registration sensors 78, and 80, a timing set device 118 to set various kinds of timings in order to activate the image formation part 50 (Y, M, C, and B) and the lasers 3 (Ya, Yb, Ma, Mb, Ca, Cb, Ba, and Bb) of the light source 3 of the optical scanning device 1, based on signals from the registration correction arithmatic unit 117; and oscillating frequency variable circuit (a voltage controlled oscillator, that is, a voltage controlled oscillating circuit, called as VCO hereinafter) 119Y, 119M, 119C, and 119B to correct deviations caused by individual errors every image formation part 50 (Y, M, C, and B), and by differences in the optical path length of each optical path in the optical scanning device 1 are connected to the timing control part 113.

The timing controller 113 is a microprocessor having a RAM part to store correction data inside, and, for example, integrated into a dedicated IC (application specific integrated circuit, called as ASIC (Application Specific Integrated Circuit) hereinafter).

The data control part 115 (Y, M, C, and B) are microprocessors having a line memory, a plurality of latch circuits, and OR gates, respectively, and similarly to the data control part 113, integrated into ASIC and the like.

The registration correction arithmetic unit 117 is a microprocessor having at least four sets of comparators and OR gates, and similarly to the data control part 113, integrated into ASIC and the like.

The VCO119 (Y, M, C, and B) is an oscillation circuit to change output frequencies according to applied voltages, and has a frequency variable range of about +/−3%. A harmonic oscillation circuit, an LC (inductive) oscillator, or simulated reactance variable LC oscillation circuit and the like are used for the oscillation circuit. And, as the VCO 119, a circuit component where an converter to convert output wave forms from sign wave forms to rectangular wave forms is built in as one block.

Image data from external storage devices not shown, or host computers are stored in the image memories 114 (Y, M, C, and B). Moreover, the outputs of the horizontal synchronization detector 23 of the optical scanning device 1 are converted into horizontal synchronization signals H-sync, and input to the data control parts 115 (Y, M, C, and B), through the horizontal synchronization signal generation circuit 121.

Then, operation of the image forming device 100 will be described, referring to FIGS. 1, and 12.

Firstly, the image formation parts 50 (Y, M, C, and B) are warm-upped by controlling the main control device 101, based on supplied signals for start of image formation from a operation panel not shown, or the host computers, and the polygon mirror 5a of the optical deflection device 5 of the optical scanning device 1 is rotated at a predetermined rotation speed by controlling the image control CPU 111.

Subsequently, image data to be printed are taken into the RAM 102 from external storage devices, host computers, or scanners (image reading devices), by controlling the main control device 101. A part (or all parts) of the image data taken into the RAM 102 is stored to the image memories 114 (Y, M, C, and B) by controlling the image control CPU 111 of the image control part 110.

A delivery roller 72 is energized at a predetermined timing, for example, based on the vertical synchronization signals V-sync from the timing control part 113 as reference by controlling the main control device 101 to pick up one paper sheet P from a paper sheet cassette 70. The paper of sheet P taken out, adjusting the timing with that of each toner image (Y, M, C, and B) provided by the image formation parts 50 (Y, M, C, and B) with the registration roller 72, is guided toward each image formation part 50 by rotating the transportation belt 52, pressed to the transportation belt 52 with an absorption roller 74.

On the other hand, in parallel with feeding and transportation operations of the paper sheet P, or, at the same time, vertical synchronization signals V-sync are output from the timing control part 113, based on data set with the timing set device 118, registration data and clock data read out from the internal RAM of the data and timing control part 113.

When vertical synchronization signals V-sync are output by the timing control part 113, the laser drive parts 116 (Y, M, C, and B) are energized by the data control parts 115 (Y, M, C, and B), and the laser beams for one line in the main-scanning direction are irradiated from the lasers 3 (Y, M, C, and B)a and the lasers 3 (Y, M, C, and B)b of each light source 3 are irradiated on the photosensitive drums 58 (Y, M, C, and B) of the image formation parts 50 (Y, M, C, and B).

The number of clocks of each VCO 119 (Y, M, C, and B) are counted, based on the laser beam for the one line, immediately after input of the horizontal synchronization signals H-sync generated in the horizontal synchronization signal generation circuit 121. When the number of clocks of each VCO 119 (Y, M, C, and B) reach a predetermined value, the image data to be printed are read out from the image memories 114 (Y, M, C, and B).

Then, image data are transferred to the laser drive parts 116 (Y, M, C, and B) by controlling the data control part 115 (Y, M, C, and B) in order to change the intensity of the laser beams L (Y, M, C, and B) emitted from each light source 3, and images without deviations are formed on the photosensitive drums 58 (Y, M, C, and B) of the image formation parts 50 (Y, M, C, and B).

Thereby, the laser beams L (Y, M, C, and B) guided by the photosensitive drums 58 (Y, M, C, and B) are accurately imaged on the photosensitive drums 58 (Y, M, C, and B) with no effects by fluctuations of beam spot diameters at the image plane caused by deviations of each optical path from each laser 3 (Y, M, C, and B)a and laser 3 (Y, M, C, and B)b of each light source 3 to the photosensitive drums 58 (Y, M, C, and B), or deviations in the diameters of the photosensitive drums 58 (Y, M, C, and B).

The first to the fourth laser beams L (Y, M, C, and B) imaged on the photosensitive drums 58 (Y, M, C, and B) of the first to the fourth image formation parts 50 (Y, M, C, and B) form electrostatic latent images, corresponding to image data, on the photosensitive drums 58 (Y, M, C, and B) by change the electrical current potential of the photosensitive drums 58 (Y, M, C, and B) electrified to a predetermined potential beforehand, based on image data.

The electrostatic latent images are converted into toner images by developing with toners having corresponding color by the developing device 62 (Y, M, C, and B).

The toner images are moved toward the paper sheet P transported with the transportation belt 52, along with the rotation of the photosensitive drums 58 (Y, M, C, and B), and transferred on the paper sheet p on the transportation belt 52 by the transfer device 64 according to a predetermined timing.

Thereby, toner images of four colors which overlaps mutually and accurately on the paper sheet P are formed on the paper sheet P. Moreover, after the toner images are transferred on the paper sheet P, the remaining toners remained on the photosensitive drums 58 (Y, M, C, and B) are removed with the cleaner 66 (Y, M, C, and B), and the remaining electrical current potential remained on the photosensitive drums 58 (Y, M, C, and B) are diselectrified by diselectriying lamps 68 (Y, M, C, and B) for application of them to the subsequent image formation.

The paper sheets P electrostatic-holding the toner images are further transported along with the rotation of the transportation belt 52, and are separated from the transportation belt 52 according to the difference between the curvature of the belt drive roller 56 and the straight advancement of the paper sheets P and guided to a fixation device 84. The paper sheets P guided to the fixation device 84 are discharged to a paper sheets tray not shown in the figure, after fixation the toner images as color image by melting each toner by the fixation device 84.

On the other hand, while the transportation belt 52 is further rotated after supplying the paper sheets P to the fixation device 84 for next transportation of paper sheets p supplied from the cassette 70, redundant toners remained on the surface are removed with a belt cleaner 82.

Though the first imaging lens 30*a* and the second imaging lens 30*b* made of plastic such as PMMA are used for the after deflection optical system 30 of the optical scanning device 1, influences of the sidelobe generated by the influence of the shape errors of the lenses cannot be neglected, as the shapes of both lenses are comparatively large. That is, when the sidelobe is generated as shown in FIG. 13B, in the intensity distribution of the laser beams, that is Gaussian distribution, the energy capable of use for formation of latent images on the photosensitive drums 58 (Y, M, C, and B) is decreased by reduction in main beams, comparing with the case without the sidelobe (FIG. 13A) if the laser intensity is the same, and especially, there is a problem that there are density irregularities (linear density irregularities) at formation of images with low density. And, in the color image forming device, there is a problem that color balance is lost, even when there is caused only a density change in any one of colors due to overlapping images of four color of Y, M, C, and B. Then the generation of the sidelobe causes a big problem for the color image forming device. Further, when a plurality of colors with low densities are overlapped at the same part, there are larger differences in the densities.

TABLE 4

First surface of lens 30a (incidence surface)

4A

| CUY | CYZ | AY | AZ |
|---|---|---|---|
| 0.0190210 | −0.0147546 | 1 | 1 |

4B

| | | | m | | | |
|---|---|---|---|---|---|---|
| n | 0 | 1 | 2 | 3 | 4 | 5 |
| 0 | 0.000E+00 | −5.075E−02 | 0.000E+00 | 3.402E−05 | −5.413E−06 | −8.876E−09 |
| 1 | 0.000E+00 | −5.988E−06 | 1.407E−07 | 1.467E−07 | 1.155E−08 | −6.891E−10 |
| 2 | −8.696E−05 | −3.944E−06 | −4.335E−07 | 5.183E−08 | −1.916E−09 | 4.486E−11 |
| 3 | 1.008E−05 | 7.221E−08 | 2.189E−08 | −1.459E−09 | 1.338E−10 | −8.773E−12 |
| 4 | −2.309E−07 | −1.553E−10 | −5.827E−10 | 4.448E−11 | −9.423E−13 | 0.000E+00 |

| | | | m | | |
|---|---|---|---|---|---|
| n | 6 | 7 | 8 | 9 | 10 |
| 0 | −3.297E−10 | 3.380E−11 | −6.406E−13 | −1.116E−14 | 7.120E−16 |
| 1 | 6.566E−12 | −5.297E−13 | 1.169E−14 | 5.802E−16 | −1.260E−17 |
| 2 | 3.950E−12 | −2.012E−13 | −4.174E−17 | −3.424E−16 | 1.399E−17 |
| 3 | −1.468E−13 | 1.466E−14 | −1.448E−16 | 2.661E−17 | −9.120E−19 |
| 4 | 0.000E+00 | 0.000+00 | 0.000+00 | 0.000E+00 | 0.000E+00 |

Formula (1)

$$X = \frac{CUY * y^2 + CUZ * z^2}{1 + \sqrt{1 - AY * CUY^2 * y^2 - AZ * CUZ^2 * z^2}} + \sum_{n=0}\sum_{m=0} A_{mn} y^m z^{2n}$$

TABLE 5

Second surface of lens 30a (emission surface)

5A

| CUY | CYZ | AY | AZ |
|---|---|---|---|
| 0.0204082 | 0.0179363 | 1 | 1 |

5B

| | | | m | | | |
|---|---|---|---|---|---|---|
| n | 0 | 1 | 2 | 3 | 4 | 5 |
| 0 | 0.000E+00 | −6.667E−02 | 0.000E+00 | 2.044E−05 | −4.684E−06 | 7.391E−09 |
| 1 | 0.000E+00 | −1.127E−06 | −2.689E−06 | 1.774E−07 | −1.558E−09 | −2.888E−10 |
| 2 | 2.387E−05 | −4.140E−06 | −3.284E−07 | 3.799E−08 | 2.264E−12 | 6.067E−12 |
| 3 | −8.930E−06 | 1.961E−07 | 1.661E−08 | −2.529E−09 | 6.180E−11 | 2.810E−12 |
| 4 | 2.522E−07 | −3.095E−09 | −5.120E−10 | 4.207E−11 | −9.508E−13 | 0.000E+00 |

TABLE 5-continued

Second surface of lens 30a (emission surface)

| n | m=6 | m=7 | m=8 | m=9 | m=10 |
|---|---|---|---|---|---|
| 0 | −9.888E−10 | 1.234E−11 | −2.037E−13 | −9.521E−17 | 2.607E−16 |
| 1 | 2.046E−11 | −7.927E−13 | 5.657E−15 | −3.536E−16 | 1.618E−17 |
| 2 | −2.478E−12 | −6.435E−14 | 3.196E−15 | 1.237E−16 | −3.821E−18 |
| 3 | −2.949E−14 | −6.090E−15 | 6.149E−17 | 4.649E−18 | −6.623E−20 |
| 4 | 0.000E+00 | 0.000E+00 | 0.000E+00 | 0.000E+00 | 0.000E+00 |

TABLE 6

First surface of lens 30b (incidence surface)

6A

| CUY | CYZ | AY | AZ |
|---|---|---|---|
| 0.002904234 | −0.006343280 | 1 | 1 |

6B

| n | m=0 | m=1 | m=2 | m=3 | m=4 | m=5 |
|---|---|---|---|---|---|---|
| 0 | 0.000E+00 | 1.660E−02 | 0.000E+00 | −3.927E−06 | −2.133E−07 | 3.818E−10 |
| 1 | 0.000E+00 | −2.644E−05 | 5.823E−07 | −1.140E−10 | 8.057E−11 | 1.705E−13 |
| 2 | −8.028E−06 | −5.092E−08 | 1.020E−11 | 1.569E−11 | −6.288E−15 | −2.339E−16 |
| 3 | −3.363E−09 | 1.290E−10 | 3.133E−12 | 5.319E−14 | −8.741E−17 | −2.001E−18 |
| 4 | 2.025E−10 | 1.118E−12 | −8.987E−15 | −1.688E−16 | −9.048E−18 | 0.000E+00 |

| n | m=6 | m=7 | m=8 | m=9 | m=10 |
|---|---|---|---|---|---|
| 0 | 1.505E−11 | 2.572E−14 | −8.037E−16 | 1.475E−18 | −1.904E−20 |
| 1 | −1.613E−14 | 7.102E−17 | −8.131E−19 | 3.084E−21 | 1.349E−23 |
| 2 | 1.893E−17 | −6.265E−19 | 1.203E−21 | 3.247E−23 | −1.577E−25 |
| 3 | 1.135E−19 | −3.473E−22 | 6.745E−24 | −4.288E−27 | −5.142E−29 |
| 4 | 0.000E+00 | 0.000E+00 | 0.000E+00 | 0.000E+00 | 0.000E+00 |

TABLE 7

Second surface of lens 30b (emission surface)

7A

| CUY | CYZ | AY | AZ |
|---|---|---|---|
| 0.002112237 | 0.001552636 | 1 | 1 |

7B

| n | m=0 | m=1 | m=2 | m=3 | m=4 | m=5 |
|---|---|---|---|---|---|---|
| 0 | 0.000E+00 | 1.022E−02 | 0.000E+00 | −4.091E−06 | −4.387E−08 | 4.082E−10 |
| 1 | 0.000E+00 | −1.972E−05 | 3.253E−07 | −1.081E−09 | 2.945E−11 | 2.841E−13 |
| 2 | −8.691E−06 | −5.126E−08 | 2.922E−10 | 1.530E−11 | −1.618E−15 | −1.539E−15 |
| 3 | −8.160E−09 | 4.185E−11 | 1.989E−12 | 4.893E−14 | 2.992E−16 | 2.713E−18 |
| 4 | 1.656E−10 | 1.372E−12 | −3.279E−15 | −1.813E−16 | −7.667E−18 | 0.000E+00 |

TABLE 7-continued

Second surface of lens 30b (emission surface)

| | m | | | | |
|---|---|---|---|---|---|
| n | 6 | 7 | 8 | 9 | 10 |
| 0 | 1.591E−12 | 9.148E−16 | 2.739E−16 | 4.265E−18 | −7.011E−20 |
| 1 | −9.708E−16 | 1.800E−17 | −1.643E−18 | 1.058E−20 | −3.151E−23 |
| 2 | −3.743E−18 | −6.221E−20 | 2.589E−21 | −1.455E−23 | −9.009E−26 |
| 3 | 7.095E−20 | −6.659E−22 | −5.008E−24 | −4.140E−26 | 1.614E−27 |
| 4 | 0.000E+00 | 0.000E+00 | 0.000E+00 | 0.000E+00 | 0.000E+00 |

As described below, referring to Tables 4A, 4B, 5A, 5B, 6A, 6B, 7A and 7B, and Formula (1), the first and the second imaging lenses 30a and 30b are a lens with an anamorphic aspheric surface with no rotational symmetry, which is formed by injection mold, that is, are difficult to be made by cutting processing. Then, as it is difficult to perform polishing of metal molds and formed lenses, it is difficult to reduce surface roughness, for example, by polishing (finish polishing) like spherical lenses made of glass. Therefore, the imaging lenses have surface roughness obtained. Thereby, there are obtained increased sidelobe, that is, there is a problem that is a changeable image densities, as described above.

On the other hand, as the present embodiment of the invention, in a system where four sets of laser beams are converged by the same imaging lens, the laser beams are entered at a position of the imaging lens away from the center thereof in the sub-scanning direction and the laser beams are entered in the incidence surface of the imaging lens with an inclination to the axis of the system, as shown in FIG. 6. It is confirmed that all of the beams have aberrations, especially, the aberrations of the beams that are pass through at far position from center of the lens in the sub-scanning direction are increased. As a result, the sidelobe are easily caused.

Therefore, the generation of the sidelobe is controlled in the present invention by making a width of an opening of a stop 10 (Ya, Yb, Ma, Mb, Ca, Cb, Ba, and Bb), which is installed for each laser beam, the most suitable size, in the optical scanning device 1 shown in FIG. 2, before deflection (scanning) of the laser beams L (Ya, Yb, Ma, Mb, Ca, Cb, Ba, and Bb) radiated respectively from four-set × two pieces of laser devices 3 (Ya, Yb, Ma, Mb, Ca, Cb, Ba, and Bb) with the polygon mirror 5a.

Specifically, the sidelobe may be reduced to less than those by the well-known optics theory, through making the width of the opening of each stop 10 (Ya, Yb, Ma, Mb, Ca, Cb, Ba, and Bb) larger than 13.5% diameter (See FIG. 13A), in the Gaussian intensity distribution of the laser beams.

That is, the spherical aberration is generally in proportion to the third power of the image size, and the coma aberration in proportion to the second power of the image size and in proportion to the tangent of the incidence angles, as described, for example, in "Lens Design Method" by Yoshiya Matsui, pp81 (Kyoritu Printing Co., Ltd). Therefore, in the optical scanning system of the embodiment of the present invention, there are easily caused the aberrations as the image size changes by the scanning position, and when there are aberrations, the sidelobe is easily generated.

Thereby, noticing that, according to the peculiar characteristics of the semiconductor laser device 3 (Ya, Yb, Ma, Mb, Ca, Cb, Ba, and Bb) (laser diode), the divergent angle in the horizontal direction to the bonding plane of the laser chip is small, and the angle in the vertical direction is large, the size of the sidelobe is controlled by changing the optical aberration through inclination of the laser diode (rotation having the center at the optical axis) so as to rotate the laser diode 3 (Ya, Yb, Ma, Mb, Ca, Cb, Ba, and Bb) while the beam sections of the laser beams are in the same plane, in order to make the direction of the bonding surface of the laser chip, which is usually set in parallel with the sub-scanning direction, not in parallel with the sub-scanning direction.

However, when the laser diodes 3 (Ya, Yb, Ma, Mb, Ca, Cb, Ba, and Bb) are rotated, it is conformed that, this time, the resolution is reduced as the section beam diameter in the main-scanning direction of the photosensitive drums 58 has been enlarged in accordance with reducing the divergent angle of the laser devices in the main-scanning direction. Especially, when the laser diodes are rotated until the bonding plane of the laser chip is in parallel with the main-scanning direction, the resolution is remarkably reduced.

Thereby, while controlling the unfavorable increase of the beam diameter by the optimization of the rotating degree of the laser diodes so as for the beam section to be on the same plane, it may be possible to reduce the size of the sidelobe. Then, it may be possible to reduce the irregularities of the image density without reducing the resolution.

But, the beam diameter changes by rotating the laser diodes, while the beam sections are on the same plane of the laser beams radiated from the laser diodes relates to the polarization direction peculiar to the laser beam.

That is, as for the section beam diameter of the laser beam radiated from the laser diodes, the divergent angle in the horizontal direction to the bonding plane of the laser chip is small, and the divergent angle in the vertical direction is large. As for the laser beam, when the divergent angle and convergent angle are small, the beam diameter becomes large. In many case, each of the laser beams are focused on the photosensitive drums 58, the horizontal direction to the bonding plane of the laser diode is in coincidence with the sub-scanning direction, and the vertical direction to the bonding plane of the laser diode is in coincidence with the sub-scanning direction, as for the laser diodes, the beam diameter on the photosensitive drums is large in the main-scanning direction, and small in the sub-scanning direction by rotation of the laser diodes. Thereby, as the resolution is reduced, it is required that the beam diameter in the main-scanning direction may be maintained to be small even under rotation of the laser diodes, and that ranges of angle of rotation of the laser diodes may be determined for enhancing an image quality.

Figure 15:
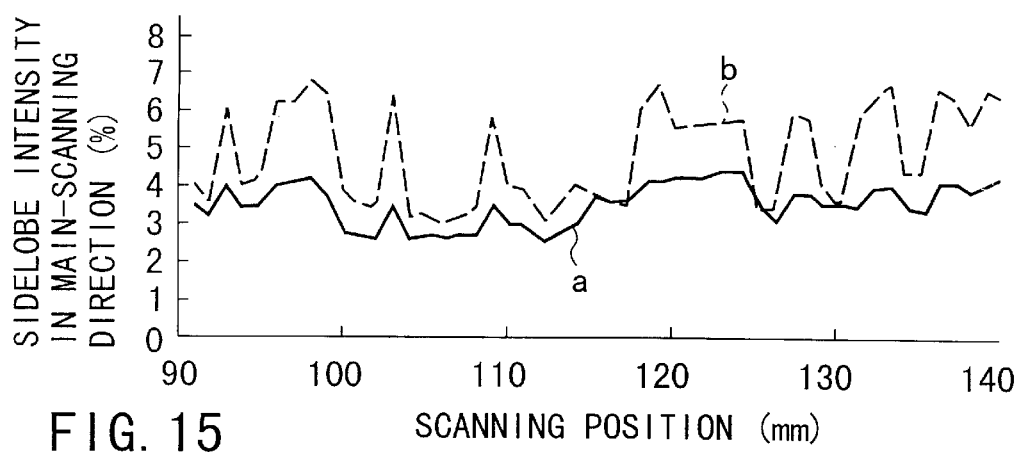
FIG. 15 shows a graph of an intensity of the sidelobe in the main-scanning direction of the optical scanning device shown in FIG. 2.

FIG. 15 shows a graph of the size of the sidelobe in the main-scanning direction. FIG. 15 is obtained by plotting through measurement of an area near the end of the image with especially large fluctuations in the size of the sidelobe at a distance of 1 mm. The curve b (dotted line) is an example where the inclination (rotation) of the laser diodes is assumed to be 0° for comparison, though, in the embodiment of the invention, the curve a (solid line) is obtained (the laser diodes are inclined so that the polarization direction is inclined at an angle of 45°).

From FIG. 15, it is confirmed that the fluctuation of the sidelobe is improved to be about 2% even at the end part (end of the image) at the scanning position (in the main-scanning direction).

Figure 16:
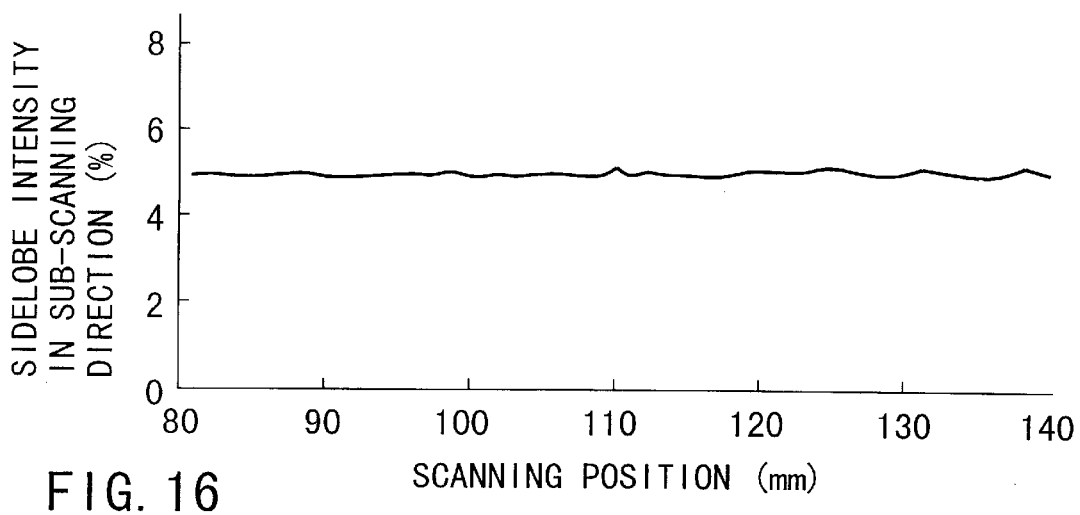
FIG. 16 shows a graph of an intensity of the sidelobe in the sub-scanning direction of the optical scanning device shown in FIG. 2.

On the other hand, in the optical scanning system, the fluctuations of the size of the sidelobe in the sub-scanning direction are small as shown in FIG. 16, as the image size and factors of aberrations are generated, are constant in the sub-scanning direction.

Figure 17:
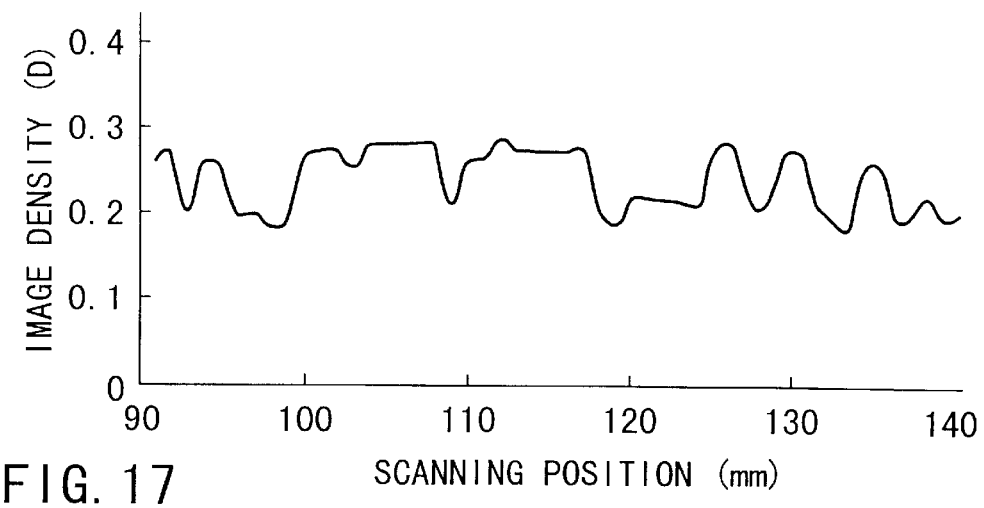
FIG. 17 shows a graph of changes in the image density obtained with the optical scanning device shown in FIG. 2.

In FIG. 17, the image densities are obtained under the conditions used in dotted line (b) of shown in FIG. 15 and a result of shown in FIG. 16. It is confirmed that there are some degrees of density irregularities due to sidelobe in the main-scanning direction. And, there is no correlation about the size of the sidelobe of the sub-scanning.

Tables 4 to 7 are denoted of the functions, and coefficients to define the lens surfaces (incidence and emitting surfaces) of the first and the second imaging lenses 30a and 30b used for the above embodiment of the invention. Where the X axis denotes the direction of an optical axis; the direction from the image plane (the photosensitive drum) to the polygon mirror is assumed to be "+"; and the Y axis and the Z axis denote the main-scanning direction and the sub-scanning direction, respectively.

As described above, in the optical scanning device 1 according to the present invention, one set of the first and the second imaging lenses 30a, 30b are used for laser beams of four colors of the after deflection optical system 30. That is, in the color image forming device, the laser beams of each color are passed at a distance in the sub-scanning direction on the imaging lenses 30a, 30b. The above is a factor for increasing the size of the sidelobe by increased optical aberration. The sidelobe is decreased by making the above width of opening of the stop 10 (Ya, Yb, Ma, Mb, Ca, Cb, Ba, and Bb) larger than 13.5% in the Gaussian intensity distribution. And, the width in the main-scanning direction of opening of each of the stops 10 (Ya, Yb, Ma. Mb, Ca, Cb, Ba, and Bb) is 7.00 mm, and the beam diameter in the sub-scanning direction is 6.8 mm (13.5% in the Gaussian intensity distribution).

Now, as the inclination of laser diodes causes small divergent angle in the main-scanning direction and larger beam diameter at the photosensitive drum, it may be possible to reduce the size of the sidelobe and prevent the increased beam diameter in the main-scanning direction by making the direction of the bonding plane of the laser chip of the laser diodes (semiconductor laser devices) not in parallel with the sub-scanning direction, for example, by inclination (rotation) at an angle of 45°, as described above.

Figure 18:
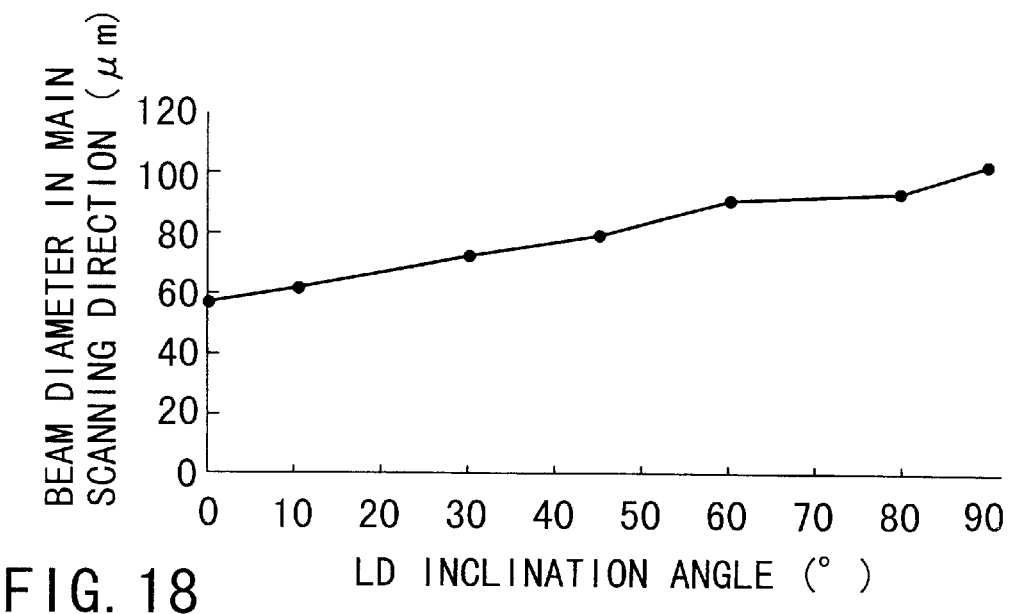
FIG. 18 shows a graph of changes in a beam diameter of laser beams in the main-scanning direction, when a laser diode of the optical scanning device shown in FIG. 2 is inclined (the laser diode is rotated) with the beam section in the same plane.
Figure 19:
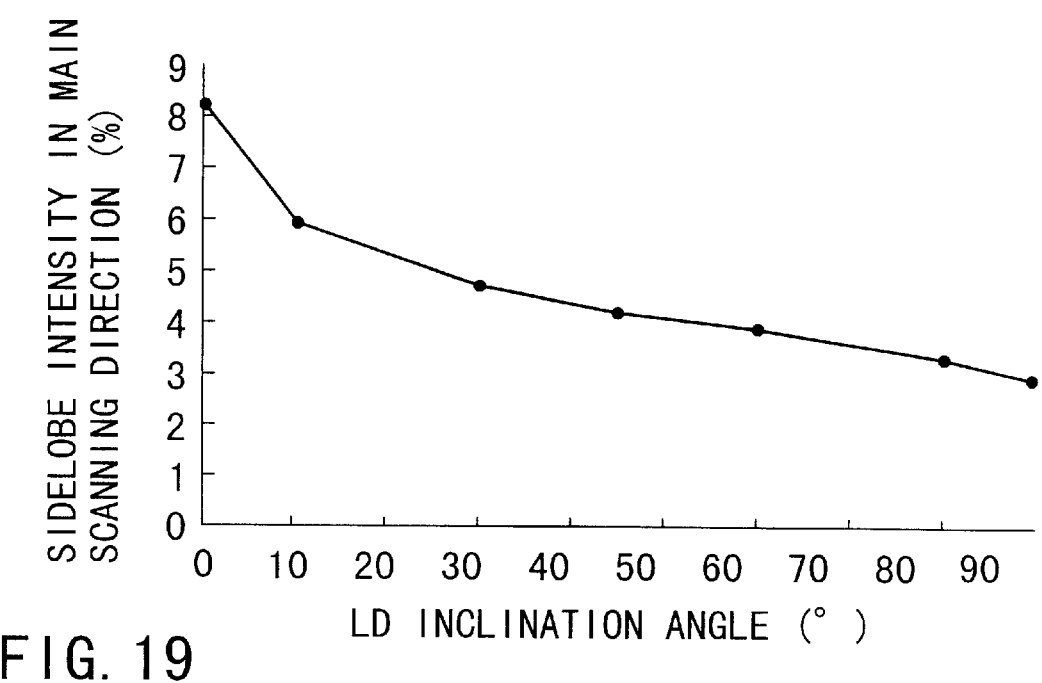
FIG. 19 shows a graph of changes in an intensity of sidelobe in the sub-scanning direction, when a laser diode of the optical scanning device shown in FIG. 2 is inclined (the laser diode is rotated) with the beam section in the same plane.

FIGS. 18 and 19 show graphs of changes in optical beam diameter and the size of the sidelobe when laser diodes are inclined (the laser diodes are rotated) while the beam sections on the same plane.

The inclination angle of laser diodes denote the angle (°) between the polarization direction of laser diodes of each, i.e., a direction of active surface (light emission phase) of each of the laser diodes and the sub-scanning direction.

FIG. 18 shows a graph of mean value in all scanning area of the main-scanning beam diameter at the inclinations of the laser diodes LD from 0° to 90°.

From FIG. 18, it is confirmed that the beam diameter becomes larger with larger inclination angle by inclination where the direction of the active surface of the each of the laser diodes is not in parallel with the sub-scanning direction. And, an angle of up to 80° is allowable for the LD inclination angle. Moreover, only considering the beam diameter, 0° may be preferable, but, considering the effects of the sidelobe shown in FIG. 19, the lower limit may be regarded as 10°.

FIG. 19 shows a graph of a relationship between the LD rotation angles and the sizes of the sidelobe.

As shown in FIG. 19, when the rotation angle (inclination angle) of the laser diodes is assumed to be an angle of θ between the polarization direction of the laser beams and the direction perpendicular to the scanning plane (plane to be scanned by the laser beam with the polygon mirror), the size of the sidelobe may be decreased within the range of "10°≦θ≦80°".

TABLE 8

| LD inclination angle (°) | 0 | 10 | 30 | 45 | 60 | 80 | 90 |
|---|---|---|---|---|---|---|---|
| Resolution subjective evaluation | ○ | ○ | ○ | ○ | ○ | ○ | x |
| Density irregularities subjective evaluation | x | ○ | ○ | ○ | ○ | ○ | ○ |

Table 8 shows results of subjective evaluations in the image resolutions and the image density irregularities, when executing the present invention, where the polarization direction of the laser beams from the laser diodes is inclined as described above, and when not executing the invention.

The each of the inclination angle of laser diode denotes the angle (°) between the polarization direction of LD and the sub-scanning direction.

When the rotation angle is assumed to be an angle of θ between the polarization direction of the laser diodes and the direction perpendicular to the scanning plane based on FIG. 4, the size of the sidelobe may be preferable within the range of "10°≦θ≦80°". The above results are in coincidence with those of the above FIGS. 18 and 19.

FIG. 14 shows an example where an amount of rotation of the polarization direction is controlled, in contrast using a polarization device to change the polarization direction peculiar to the laser beams from the laser diodes, and the polarization characteristics. In the figure, the reflectance ratio is obtained, using "P polarization", "S polarization", and "intermediate value between the P polarization and the S polarization" as parameter. Then, it is shown that, the transmittance ratio is calculated by 1–(minus) reflectance ratio of shown in FIG. 4.

Generally speaking, as the laser beams approach the periphery of the imaging lens, the laser beams become larger in incident angle and smaller in transmittance. Therefore, the light intensity on each of the photosensitive drums will be weak, resulting in deterioration in image density.

From the above, as the transmittance at the P polarization becomes larger when there is in coincidence between the sub-scanning direction and the main-scanning direction, and the incidence angle becomes large, it may be possible to reduce the fluctuations in the transmittance ratio at the position of the imaging lens away from the center thereof by installing the polarization device so as to perform the P polarization, when the laser diodes are fixed.

That is, when the incidence angle is large, it may be possible to reduce the fluctuations in the transmittance by approaching to the P polarization, as the transmittance is reduced. Since the transmittance for the P polarization becomes large, only by arrangement of the laser diodes so as to make the polarization direction of the laser beam in parallel with the sub-scanning direction, and perform the S polarization at the after deflection optical system. Thus, the transmittance at the end of scanned area may be improved by approaching to the P deflection from the S deflection through inclination of the laser diodes.

Figure 20:
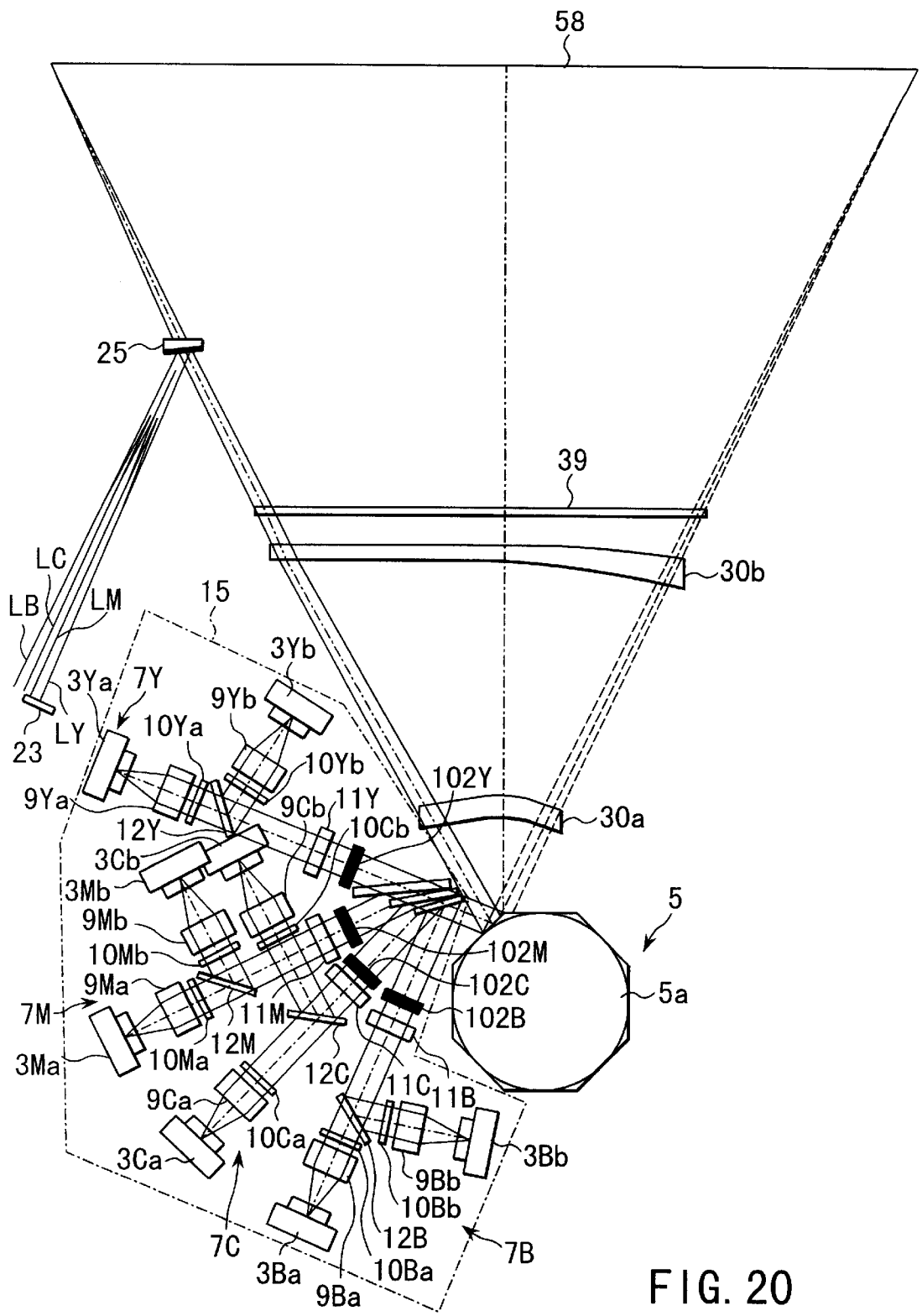
FIG. 20 shows a schematic view of another embodiment an optical scanning device different from the device shown in FIG. 2.

FIG. 20 shows a schematic view of further another embodiment of the present invention. And the configurations similar to those previously described referring to FIG. 2 are denoted by the same reference numbers, and detailed description will be eliminated.

As shown in FIG. 20, an optical scanning device 201 is characterized in that a retarder (a half-wave plate, or a λ/4 plate, and called as a wavelength plate) 14 is provided between a hybrid anamorphic lens 11 (Y, M, C, and B) and a laser composition mirror unit 13. Moreover, the differences from the optical scanning device 1 shown in FIG. 2 is in arrangement of each laser diodes so that the polarization direction of the laser beams is in parallel (not inclined, different from the above embodiment) with the direction perpendicular to the scanning plane.

That is, the angle of the convergence of each of the laser beams on the photosensitive drums 58 of each, i.e., the divergence angle of each of the laser beams emitted from the laser diodes of each, are held larger. Therefore, the diameters of each of the laser beams in the main-scanning direction are kept smaller even resulting in enhance in the image quality.

As already described in detail, by using lenses 30a and 30b made of plastic for the after deflection optical system 30, as the transmittance of laser beams entering to the lens is the largest at a vertical incidence, and the transmittance becomes smaller with larger angle (incidence angle) against the normal line to the incidence plane, the transmittance becomes small in the end part of the scanning area of the imaging lenses 30a and 30b, and there is larger differences in the luminous energy between in the center area and in the end part of the scanning area (terminating part). Then the difference in the image density is increased.

When considering the deposition on the surface of each lens for improvement of the transmittance in order to prevent the density difference, it is necessary to make the shape before the deposition from that of aimed shape, considering the heat effect at the deposition as the optical characteristics are worsened by the deformation caused by the high temperature at the deposition, because the lenses are made of plastic. That is, it may be much difficult to manufacture them. And cost-up caused by the deposition may not be avoided.

Moreover, the imaging lens 30a, 30b for the embodiment of the present invention have free and curved surface difficult to manufacture them by machine work. Further, it is difficult to polish them for controlling the surface roughness. Then, there are many components which scatter on the surface of the lenses by the effects of the surface roughness. Therefore, it may not be said that the transmittance is high, and especially, density irregularities of the images are caused with reduced transmittance at the end part of the scanning area.

Thereby, the feature of the invention is that, the polarization direction of the laser beams from the laser diodes is changed, using the wavelength plate (a λ/2 plate or a λ/4 plate) 214, and the transmittance at the end part of the scanning area of the imaging lenses 30a and 30b is configured to become large.

For example, when a λ/2 plate is used, the polarization direction of the laser beams becomes from the S polarization to the P polarization. And, when a λ/4 plate is used, the laser beams from the laser diodes fixed to the S polarization become of the circularly polarization.

As mentioned above, the reflectance ration of the optical components for the after deflection optical system 30, and the fluctuations in the luminous energy on the scanning plane are reduced by using the λ/2 plate or the λ/4 plate. But, when the polarization device 214 is used, it may be possible to reduce the fluctuations in the luminous energy without larger beam diameter. As a result, the density irregularities may be reduced without worsening the image resolution.

The wave length plate 214 is installed after the hybrid anamorphic lens 11 of the before deflection optical system in the optical scanning device 201 shown in FIG. 20, but it may be arranged before the hybrid anamorphic lens 11.

Figure 21:
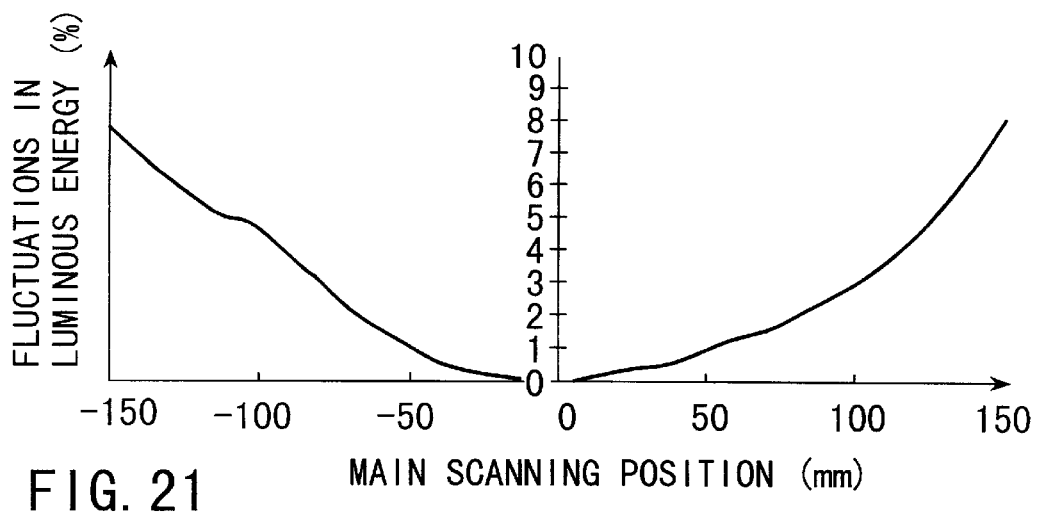
FIG. 21 shows a graph of irregularities of the luminous energy for description of effects of a wavelength plate, eliminating the wavelength plate from the optical scanning device shown in FIG. 20.
Figure 22:
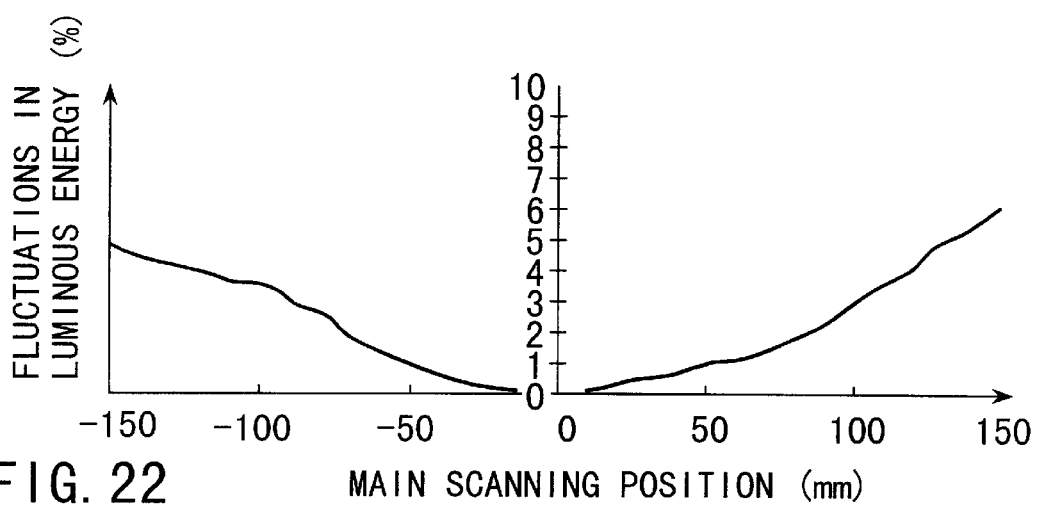
FIG. 22 shows a graph of irregularities of the luminous energy, when a $\lambda/2$ plate is used for the wavelength plate of the optical scanning device shown in FIG. 20.
Figure 23:
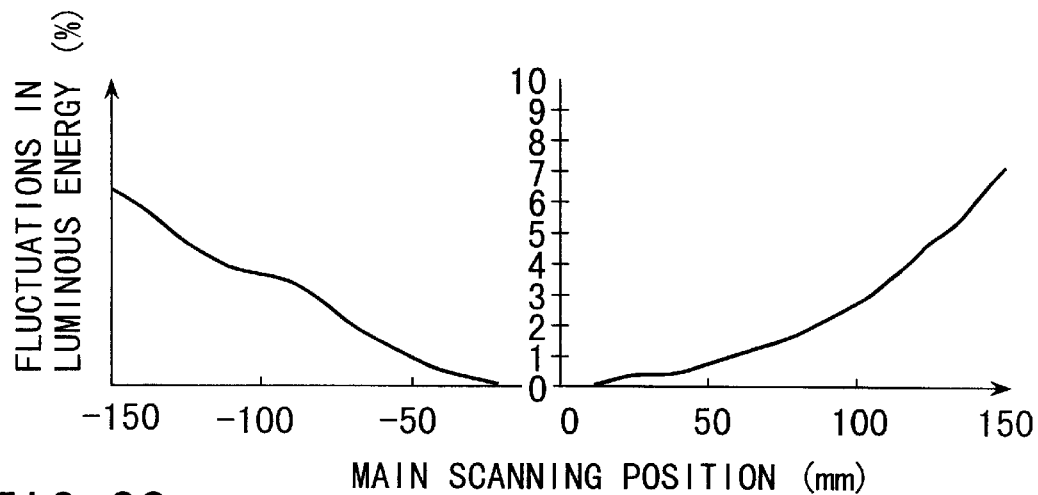
FIG. 23 shows a graph of irregularities of the luminous energy, when a $\lambda/4$ plate is used for the wavelength plate of the optical scanning device shown in FIG. 20.

FIGS. 21 to 23 show a graph of the fluctuations in the luminous energy when using the wavelength plate 214, and when not using the plate. When the wavelength plate 214 is not used as shown in FIG. 21, the fluctuations all over the main-scanning direction become about 8% at the maximum, and when the λ/2 plate is used as shown in FIG. 22, the fluctuations become about 6% at the maximum. And in the case of the λ/4 plate used shown in FIG. 23, the maximum fluctuation become about 7%.

Figure 24:
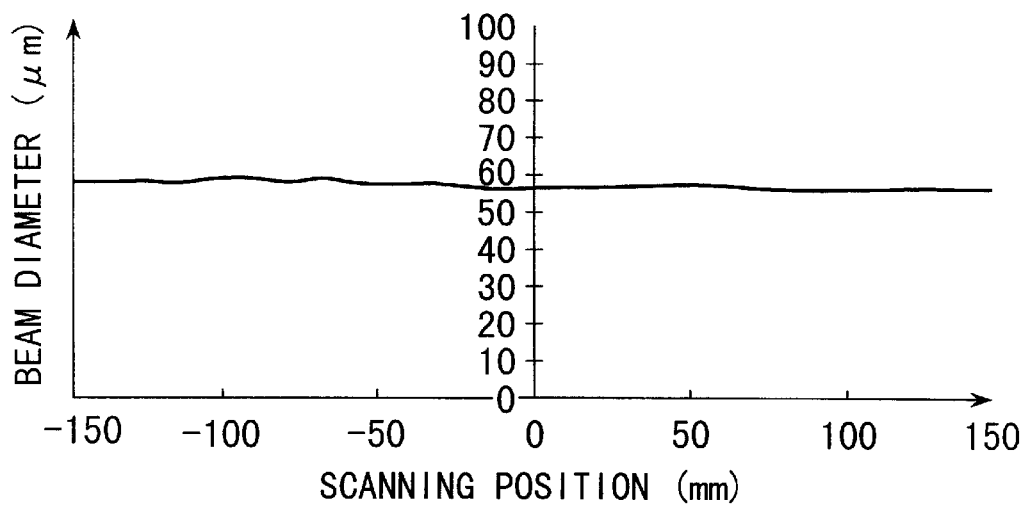
FIG. 24 shows a graph of changes in a beam diameter of laser beams in the main-scanning direction according to wavelength plate of the optical scanning device shown in FIG. 20.
Figure 25:
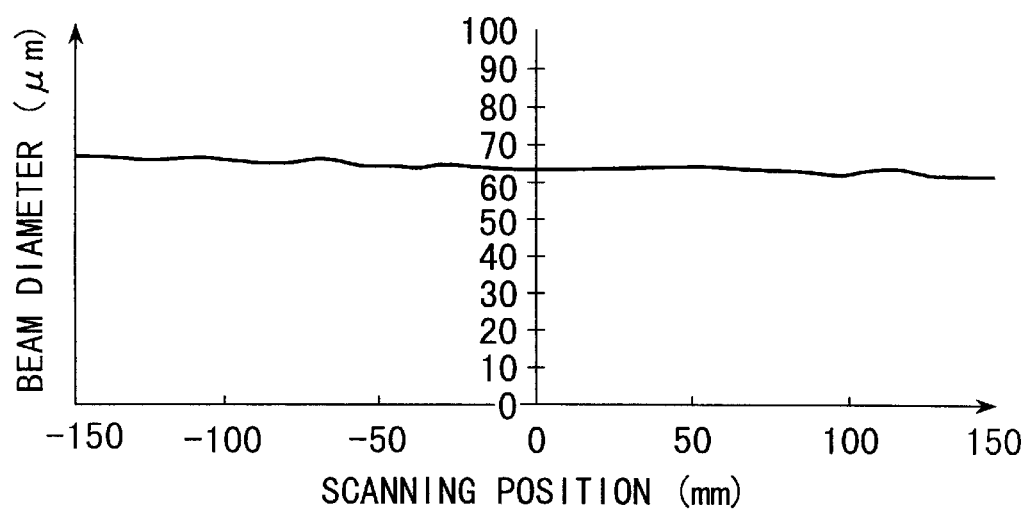
FIG. 25 shows a graph of changes in a beam diameter of laser beams in the main-scanning direction according to wavelength plate of the optical scanning device shown in FIG. 20.

FIGS. 24 and 25 show a graph of the difference in the beam diameter in the main-scanning direction between when the wavelength plate is used, and when the plate is not used. It is confirmed that the beam diameter is not changed by use of the wavelength plate. Therefore, the density irregularities may be possible to be reduced without worsening the resolution.

As described above, in the optical scanning device of the present invention, the density difference caused by influence of the sidelobe, which is generated by changing the image size (caused at any arbitrary position in the main-scanning direction of the imaging position) depending on the main-scanning position peculiar to the optical scanning system, may be prevented through controlling the luminous energy by optimization of the aperture opening. That is, it may be possible to control the density difference used by the influence of the sidelobe which is brought about by using the plastic lens for the after deflection optical system.

Further, the optical scanning device according to the present invention may prevent the occurrence of the density difference by the influence of the sidelobe caused by the shape and the surface roughness which are brought about through making the imaging lens of a free and curved surface lens, when the optical polarization direction of rays emitted by the laser diodes is inclined. And, when one set of lenses are used for the after deflection optical system in the sub-scanning direction, there are some laser beams passing through the part away from the center of the lenses in the sub-scanning direction. Then, the transmittance is reduced and to cause the sidelobe, and similarly the density difference is caused, but it may be solved by the present invention. Further, especially when forming color images, the possible density difference related with each color may be reduced.

In addition, the optical scanning device of the present invention may control the reduction in the luminous energy in the optical polarization direction of the rays from the laser device.

Moreover, the optical scanning device of the present invention may prevent the density irregularities due to the generated sidelobe and the reduced luminous energy caused by the shape errors and the reduced transmittance which are brought about by making he imaging lens of a free and curved surface lens.

The problems caused in relation to the polarization direction of the laser beams from the laser device may be solved either by a method to rotate the laser device so that the beam section of the laser beams is on the same plane, or by a method to insert a polarization device (a $\lambda/2$ plate or a $\lambda/4$ plate) into the optical path.

As described above, according to the present invention, the reduction in luminous energy of laser beams caused by influence of the sidelobe by optical aberration may be prevented. Therefore, exposing with no change in the luminous energy all over the main-scanning direction may be realized. Thereby, images with less irregularities in the image density may be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical device comprising:
   at least one of lens to convert divergent rays from a laser diode to parallel or convergent rays; a slit to regulate luminous energy of the parallel or convergent rays; a before deflection optical system having a lens or lenses with different power for main-scanning and sub-scanning; optical scanning means to scan objects to be scanned with said parallel or convergent rays; and an imaging optical system for imaging on said objects to be scanned by passing the scanned rays with said optical scanning means,
   wherein said slit of said before deflection optical system having an opening with a larger width than a 13.5% diameter of the optical intensity of said rays in at least one direction of the main-scanning and the sub-scanning directions.

2. An optical device according to claim 1, wherein at least one of active surface layer and polarization direction of said laser diode and said sub-scanning direction are not parallel.

3. An optical device according to claim 1, wherein said imaging optical system includes at least one plastic lens.

4. An optical device according to claim 3, wherein at least one of active surface layer and polarization direction of said laser diode and said sub-scanning direction are not parallel.

5. An optical device according to claim 3, wherein said imaging optical system has at least one of lens with at least one of lens surface not having a symmetry axis of rotation.

6. A optical device according to claim 5, wherein
   at least one of active surface layer and polarization direction of said laser diode and said sub-scanning direction are not parallel.

7. An optical system according to claim 1, wherein only one set of said imaging optical system is provided.

8. An optical device according to claim 7, wherein at least one of active surface layer and polarization direction of said laser diode and said sub-scanning direction are not parallel.

9. An optical device comprising:
   at least one of lens or lenses to convert divergent rays from a laser diode to parallel or convergent rays; a before deflection optical system includes at least one of lens with different power for main-scanning and sub-scanning; optical scanning means to scan objects to be scanned with said parallel or convergent rays; and an imaging optical system for imaging on said objects to be scanned by passing the scanned rays with said optical scanning means,
   wherein an angle θ between at least one of active surface layer and polarization direction of said laser diode, and a direction perpendicular to a plane which said rays scan by said optical scanning means is $10°\leq\theta\leq80°$.

10. An optical device according to claim 9, wherein said imaging optical system includes at least one plastic lens.

11. An optical device according to claim 10, wherein said imaging optical system has at least one of lens with at least one of lens surface not having a symmetry axis of rotation.

12. An optical device comprising:
    at least one of lens or lenses to convert divergent rays from a laser diode to parallel or convergent rays; a slit to regulate luminous energy of the parallel or convergent rays; a before deflection optical system having at least one of lens with different power for main-scanning and sub-scanning; optical scanning means to scan objects to be scanned with said parallel or convergent rays; and an imaging optical system for imaging on said objects to be scanned by passing the scanned rays with said optical scanning means,
    wherein a polarization device to change a polarization direction of said parallel or convergent rays is provided.

13. An optical device according to claim 12, wherein said polarization device is a $\lambda/2$ plate.

14. An optical device according to claim 12, wherein said polarization device is a $\lambda/4$ plate.

15. An optical device according to claim 12, wherein said imaging optical system has at least one plastic lens.

16. An optical device according to claim 15, wherein said polarization device is a $\lambda/2$ plate.

17. An optical device according to claim 15, wherein said polarization device is a $\lambda/4$ plate.

18. An optical device according to claim 15, wherein said imaging optical system includes at least one of lens with at least one of lens surface not having a symmetry axis of rotation.

19. An optical device according to claim 18, wherein said polarization device is a $\lambda/2$ plate.

20. An optical device according to claim 18, wherein said polarization device is a $\lambda/4$ plate.

21. An optical device according to claim 12, wherein only one set of said imaging optical system is provided.

22. An optical device according to claim 21, wherein said polarization device is a $\lambda/2$ plate.

23. An optical device according to claim 21, wherein said polarization device is a $\lambda/4$ plate.

* * * * *